United States Patent
Peralta

(12) 
(10) Patent No.: US 6,402,656 B1
(45) Date of Patent: Jun. 11, 2002

(54) LIMITED SLIP DIFFERENTIAL

(76) Inventor: Mark Peralta, 315 E. 167 St., Bronx, NY (US) 10456

(*) Notice: Subject to any disclaimer, the term of this patent is extended or adjusted under 35 U.S.C. 154(b) by 0 days.

(21) Appl. No.: 09/518,027

(22) Filed: Mar. 3, 2000

(51) Int. Cl.$^7$ .............................................. F16H 48/10
(52) U.S. Cl. ...................................... 475/252; 475/249
(58) Field of Search ................................. 475/249, 252

(56) References Cited

U.S. PATENT DOCUMENTS

| | | | | |
|---|---|---|---|---|
| 1,229,548 A | * | 6/1917 | Van Sant et al. | 475/252 X |
| 2,269,734 A | * | 1/1942 | Powell | 475/252 |
| 2,651,215 A | * | 9/1953 | Schoenrock | 475/249 |
| 2,786,366 A | * | 3/1957 | Tallakson | 475/249 |
| 3,251,244 A | | 5/1966 | Nickell | 74/711 |
| 3,292,456 A | | 12/1966 | Saari | 74/711 |
| 3,375,735 A | * | 4/1968 | Saari | 475/249 |
| 3,738,192 A | | 6/1973 | Belansky | 74/711 |
| 3,869,013 A | | 3/1975 | Pagdin et al. | 180/44 R |
| 4,012,968 A | | 3/1977 | Kelbel | 74/711 |
| 4,272,993 A | | 6/1981 | Kopich | 74/711 |
| 4,516,443 A | | 5/1985 | Hamano et al. | 74/711 |
| 4,630,505 A | | 12/1986 | Williamson | 74/711 |
| 4,869,129 A | | 9/1989 | Hazebrook | 74/711 |
| 4,939,953 A | | 7/1990 | Yasui | 475/233 |
| 5,083,987 A | * | 1/1992 | Korner et al. | 475/252 X |
| 5,122,101 A | * | 6/1992 | Tseng | 475/252 |
| 5,162,023 A | | 11/1992 | Kwoka | 475/87 |
| 5,162,024 A | | 11/1992 | Yoshiba | 475/89 |
| 5,232,410 A | | 8/1993 | Yanai | 475/84 |
| 5,244,440 A | | 9/1993 | Ichiki et al. | 475/252 |
| 5,302,159 A | | 4/1994 | Dye et al. | 475/227 |
| 5,366,422 A | * | 11/1994 | Dye et al. | 475/249 |
| 5,456,642 A | | 10/1995 | Frost | 475/93 |
| 5,611,746 A | | 3/1997 | Shaffer | 475/88 |
| 5,616,096 A | * | 4/1997 | Hagiwara | 475/249 |
| 5,632,704 A | * | 5/1997 | Yamazaki et al. | 475/252 X |
| 5,728,024 A | * | 3/1998 | Ishizuka et al. | 475/252 |

FOREIGN PATENT DOCUMENTS

| | | | | |
|---|---|---|---|---|
| DE | 4027423 | * | 3/1992 | 475/249 |
| EP | 130806 A2 | | 1/1985 | F16H/1/42 |
| JP | 6137386 | * | 5/1994 | 475/249 |

* cited by examiner

Primary Examiner—Charles A Marmor
Assistant Examiner—Ha Ho
(74) Attorney, Agent, or Firm—Harvey Lunenfeld

(57) ABSTRACT

A limited slip differential comprising a casing containing a fluid medium, the casing rotatably driven along an axis by an input member; a plurality of opposing pinions therein the casing that are immersed in the casing fluid medium, having substantially parallel rotational axes, the opposing pinions meshing one with the other circumferentially at medial portions of the meshing opposing pinions; the pinions having partitions therebetween lateral and said medial portions of each of the opposing pinions; opposing driven gears, immersed in the casing fluid medium, the opposing driven gears meshing with a plurality of the lateral portions; the opposing driven gears having output shafts adjoined thereto; the casing having opposing holes therethrough, the opposing output shafts rotatably mounted therethrough; and seals adapted to retain said fluid medium therein said casing.

37 Claims, 13 Drawing Sheets

FIG. 2
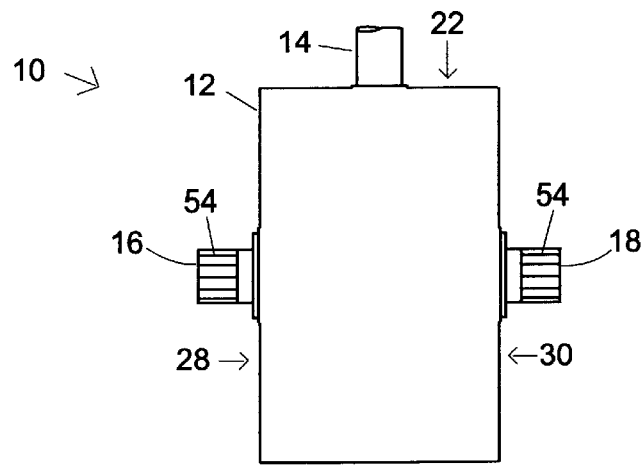
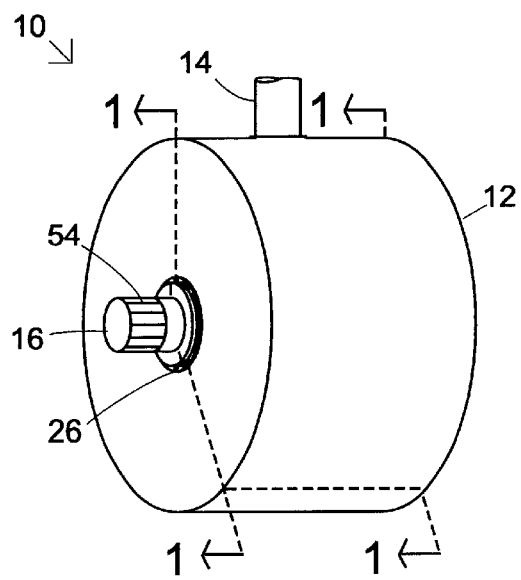
FIG. 3
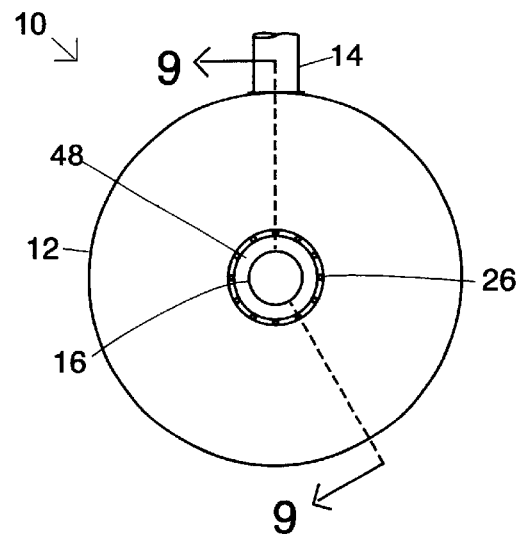
FIG. 4

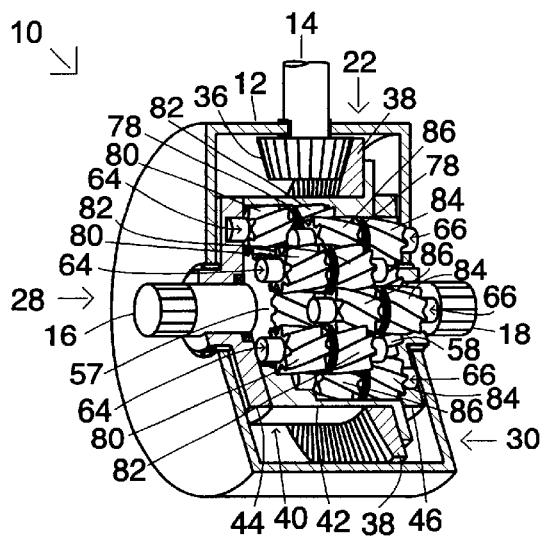

FIG. 16A
FIG. 16B
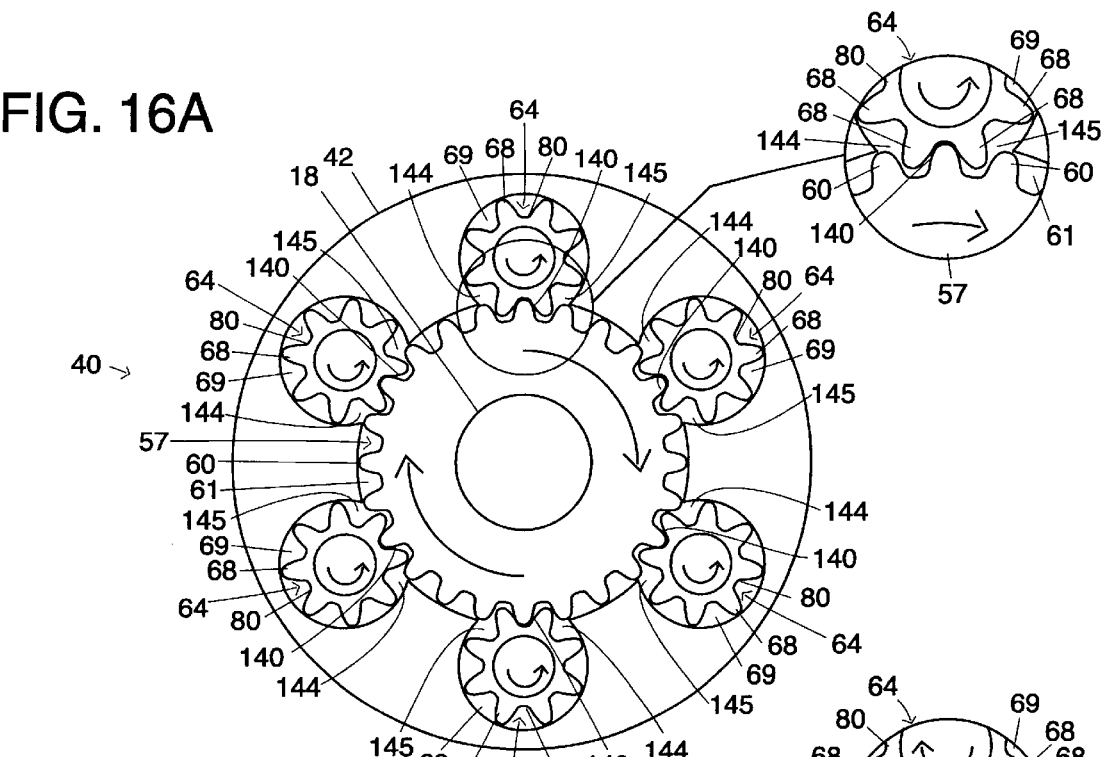
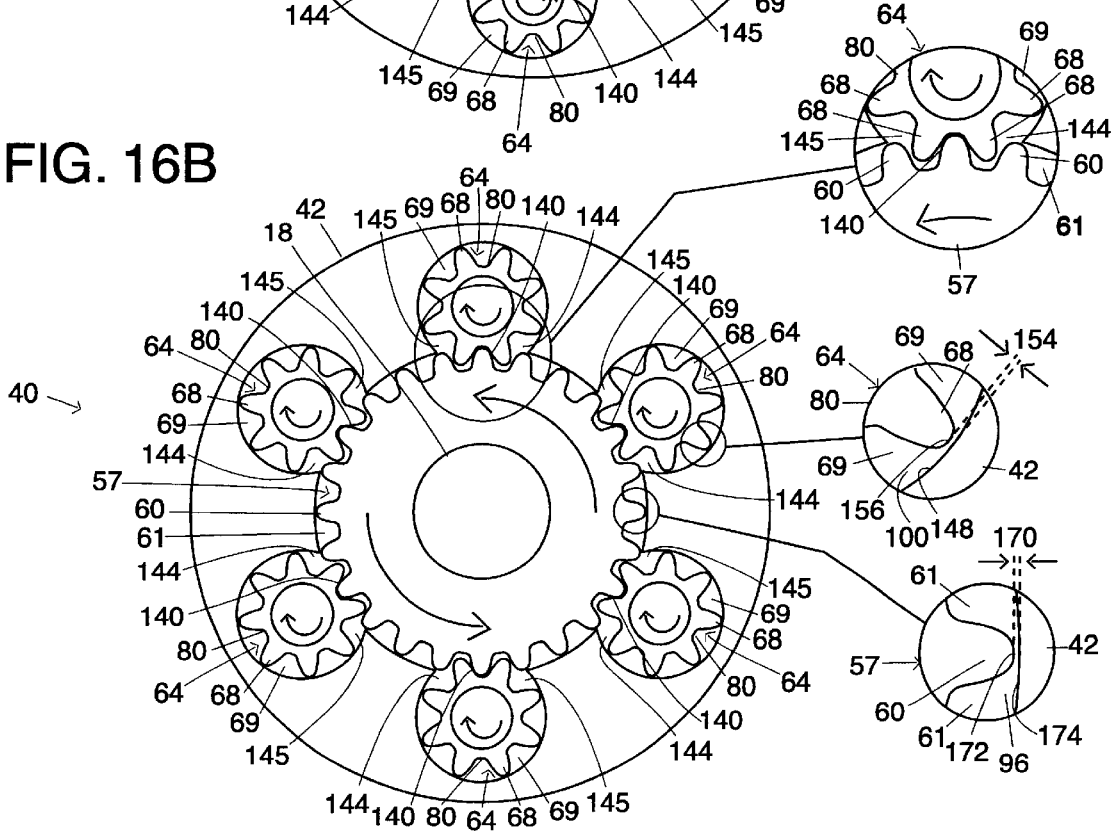

LIMITED SLIP DIFFERENTIAL

BACKGROUND OF THE INVENTION

1. Field of the Invention

The present invention relates generally to differentials and more particularly to limited-slip differentials.

2. Background Art

An axle with a wheel affixed to each end may be driven by a power source to propel a vehicle in a substantially straight line. However, when making either a left or right turn, the wheel on the outer end of the axle travels a greater distance than the wheel on the inner end of the axle, causing the outer wheel to rotate faster than the inner wheel. This generally leads to twisting of the axle, and often results in wheel hop and/or axle breakage.

Differentials having a single input member, which drive two output members in a manner that permit the speeds of each of the output members to differ have been known. Differentials emerged from the need to have both output wheels of a driven axle to rotate at different speeds. Typical current day differentials still remain quite similar to the first known successful differential, invented in 1827 by Onesiphore Pecqueur, a Frenchman. Today's differentials have an input gear that meshes with a ring gear, as in the earlier differential by Pecqueur. The ring gear drives a casing that carries bevel toothed pinions, which mesh with left and right side gears that power the left and right wheels, respectively. Both wheels rotate at the same speed, when the wheels travel a straight line, causing the pinions to remain stationary in the rotating casing. When making a turn, the pinions allow the wheels to rotate at different speeds, by rotating at their respective axes in the rotatable casing.

Torque from the input gear is split into two substantially equal components, which are distributed substantially equally to the left and right wheels. Consequently, if one of the driven wheels rotates on ice or mud, the wheel on the ice or mud spins, while torque to the wheel not on the ice or mud is reduced. This condition increases the risk of a motor vehicle having such a differential of becoming immobilized on substantially slippery surfaces.

When a motor vehicle travels in a curvilinear direction, such as when the vehicle turns left or right, or travels in a direction other than a straight line, such as on dry pavement, a relatively small speed difference occurs between the left and right wheels. However, when the vehicle travels on ice, snow, or through mud, the differential speed between the left and right wheels increases substantially beyond the relatively small speed difference which occurs between the wheels on dry pavement. In this instance "slip limitation" is desirable otherwise the vehicle may become immobilized. On the other hand, slip limitation is not desirable in normal driving situations since slip limitation may adversely affect directional control of the vehicle and accelerate tire wear.

"Limited slip differentials" have been known, which limit the speed differentiation or "slip," so that some of the torque being delivered by the input gear is transferred from the wheel that slips to the wheel that has more traction, and, therefore, aids in moving the vehicle in the preferred direction.

These limited slip differentials (LSD) have been developed to overcome the above mentioned shortcomings of a conventional differential, and work on various principles, but generally are all intended to limit the speed difference or "slip" between the left and right driven wheels. Such limited slip differentials generally limit the speed differentiation or "slip" between the driven wheels, so that some of the torque being delivered by the input gear is transferred from the wheel that slips to the wheel that has more traction, and, therefore, aids in moving the vehicle in the preferred direction. However, most of these limited slip differentials do not limit the speed difference between the driven wheels adequately at a substantially large speed differential or slip between the driven wheels. Other limited slip differentials have valves, clutches, pistons or other special components that add to the complexity and cost of production.

There is a need for a limited slip differential, which limits the speed differentiation or "slip" between the driven wheels, and gradually increases torque to the non-slipping wheel, as the rotational speed difference between the slipping wheel and the non-slipping wheel increases. The rate of increase of the torque to the non-slipping wheel should increase, as the speed difference between the slipping wheel and the non-slipping wheel increases. The rate of increase of the torque applied to the non-slipping wheel should preferably increase at a greater rate than the rate of increase of the speed difference between the wheels. Torque transfer should be substantially zero or minimal between both driven wheels, when there is substantially no speed difference or slip between the driven wheels, since such torque transfer is not required when there is substantially no speed difference or slip between the driven wheels. The rate of increase of the torque applied to the non-slipping wheel should be adjustable by modifying physical characteristics of the limited slip differential. Such limited slip differentials should be inexpensive, durable, long lasting, easy to manufacture and install, either as an original equipment item or as a retrofit, easy to maintain, and require a minimum of maintenance.

When applied to a motor vehicle, the limited-slip differential should provide slip limitation or torque transfer substantially only when speed difference between the driven wheels of the motor vehicle is beyond normal driving limits. The torque transfer should increase as the speed difference between the driven wheels increases, and aid in decreasing the probability of a vehicle becoming immobilized during slippery conditions. The rate of increase of the torque applied to the non-slipping wheel should preferably increase at a greater rate than the rate of increase of the speed difference between the driven wheels. Such limited slip differentials should be inexpensive, durable, long lasting, sturdy, easy to manufacture and install, either as an original equipment item or as a retrofit, be capable of having a substantially similar form factor and size as original equipment items, be easy to maintain, and require a minimum of maintenance. The limited slip differential should also be compatible with anti-lock braking systems, two, four, and multiple drive vehicles, and be useable in vehicle and other applications.

Different limited slip differentials have heretofore been known. However, none of the limited slip differentials adequately satisfies these aforementioned needs.

Mechanical limited slip differentials have been disclosed. U.S. Pat. No. 4,516,443 (Hamano et al) and U.S. Pat. No. 4,939,953 (Yasui) disclose mechanical limited slip differentials, each having a set of clutches connected to a casing, which alternate with another set of clutches attached to one or two side gears. The clutches are kept in contact by a preloaded spring, through which both wheels are always contacted to some extent. These limited slip differentials "bind" the wheels together, starting with a specified amount of torque, but increasing the slip limitation when the input torque increases. Therefore, there is always a certain amount of torque transfer between the left and right wheel, even in normal driving when it is not needed.

Parallel-axis limited slip differentials have been disclosed. U.S. Pat. No. 5,244,440 (Ichiki et al) discloses a parallel-axis differential having a plurality of pinions, in which friction produced by meshing and rubbing of the pinions provides slip limitation. U.S. Pat. No. 5,302,159 (Dye et al) discloses a parallel-axis differential in which friction produced by end thrust of pinions and side gears to a casing, resulting from specific helical tooth angles, provides slip limitation.

U.S. Pat. No. 3,292,456 (Saari) and U.S. Pat. No. 3,738,192 (Belansky), and European Patent No. 130806A2 (Quaife) disclose parallel-axis differentials having pinions that are continuously meshed in a circumferential manner, which provide slip limitation, resulting from an increase in frictional surfaces at tooth meshing points and between pinions and casing. Slip limiting action of these aforementioned parallel-axis differentials are dependent on input torque and not on the speed difference between the driven wheels. Such limited slip differentials may be acceptable for driven wheels on dry pavement, but are not adequate on slippery surface.

Parallel-axis differentials using the resistance to pumping action have been disclosed. U.S. Pat. No. 3,251,244 (Nickell), U.S. Pat. No. 4,272,993 (Kopich), and U.S. Pat. No. 5,083,987 (Korner et al) disclose parallel-axis differentials having pinions in pairs, in which meshing teeth also function as pumps, and the resistance to pumping action provides slip limitation. U.S. Pat. No. 4,630,505 (Williamson) also discloses a parallel-axis differential, which also functions as a pump, in which the resistance to pumping action provides slip limitation, the side gears being internally toothed, instead of having external toothing. These differentials produce increasing slip limitation, as the speed difference between the driven wheels increases. However, although such low displacement designs result in low slip limiting capacity.

U.S. Pat. No. 5,232,410 (Yanai) and U.S. Pat. No. 5,162,024 (Yoshiba) disclose limited slip differentials that use pumping resistance for slip limitation. Piston pumps are used instead of gear pumps, as seen in the parallel-axis differentials described above. A round cylinder block carrying pistons in a radially outward direction is attached to a side gear. Another side gear has an internal surfaced cam that drives the pistons to pump fluid across a restricted outlet. Yanai also discloses a torque curve for different orifice sizes relative to differential speed. Although these differentials produce increasing slip limitation with increasing speed difference at the driven wheels, such devices are costly as a result pistons, cylinders, and spool valves required in the differential.

Vehicle drive train couplings using the resistance to pumping action have been disclosed. U.S. Pat. No. 3,869,013 (Pagdin et al) and U.S. Pat. No. 5,456,642 (Frost) disclose vehicle drive train couplings, using resistance to pumping action of gear pumps to transmit torque across the couplings. Torque curves in relation to the speed difference across the couplings are also disclosed.

Limited slip differentials having viscous couplings have been disclosed. U.S. Pat. No. 4,869,129 (Hazebrook) and U.S. Pat. No. 5,162,023 (Kwoka) disclose viscous couplings attached to a casing and an output member. The coupling units have stacks of alternating discs immersed in a viscous fluid medium. The presence of speed difference between left and right wheel causes the alternating discs to rotate at different speeds, shearing along the fluid medium between the stacks of the alternating discs. The shearing resistance of the viscous fluid provides slip limitation or torque transfer between the left and the right wheel. The fluid shearing resistance increases as the speed difference increases, thus resisting the "slip" between the two wheels with increasing force, as the speed difference between the two wheels increases; however, the maximum torque capacity of the viscous coupling is relatively small.

U.S. Pat. No. 4,012,968 (Kelbel) and U.S. Pat. No. 5,611,746 (Shaffer) disclose limited slip differentials that limit the slip above a predetermined differential speed. The devices have clutches that are engaged by fluid pressure. A gerotor pump pushes fluid whenever there is a differential speed, increasing fluid pressure inside a cylinder which pushes a piston that engages the clutches. Additional increase in differential speed also increases pumping action, which further increases fluid pressure, leading to increase in torque transfer or slip limitation. Shaffer further discloses a pressure-sensing valve that closes at a set pressure or fluid-flow velocity, thus, providing a sharp increase in slip limitation above a predetermined differential. However, the construction of this limited-slip differential requires a pump, valves, cylinder, piston, seals, and clutches that add to the complexity and cost of the device.

For the foregoing reasons, there is a need for a limited slip differential which limits the speed differentiation or 'slip' between the driven wheels and which gradually increases torque to the non-slipping wheel, as the rotational speed difference between the slipping wheel and the non-slipping wheel increases. The rate of increase of the torque to the non-slipping wheel should increase, as the speed difference between the slipping wheel and the non-slipping wheel increases. The rate of increase of the torque applied to the non-slipping wheel should preferably increase at a greater rate than the rate of increase of the speed difference between the driven wheels. Torque transfer should be substantially zero or minimal between both driven wheels, when there is substantially no speed difference or slip between the driven wheels, since such torque transfer is not required when there is substantially no speed difference between the driven wheels. The rate of increase of the torque applied to the non-slipping wheel should preferably increase at a greater rate than the rate of increase of the speed difference between the driven wheels. The rate of increase of the torque applied to the non-slipping wheel should be adjustable by modifying physical characteristics of the limited slip differential. Such limited slip differentials should be inexpensive, durable, long lasting, sturdy, easy to manufacture and install, either as an original equipment item or as a retrofit, be capable of having a substantially similar form factor and size as original equipment items, be easy to maintain, and require a minimum of maintenance. The limited slip differential should also be compatible with anti-lock braking systems, two, four, and multiple drive vehicles, and be useable in vehicle and other applications.

The limited-slip differential should provide substantial slip limitation or torque transfer substantially only when speed difference between the driven wheels is beyond normal vehicle driving limits. The torque transfer should increase as the differential speed continues to rise, which aids in decreasing the probability of a vehicle becoming immobilized during slippery conditions. The rate of increase of the torque applied to the non-slipping wheel should preferably increase at a greater rate than the rate of increase the speed difference between the wheels.

SUMMARY

The present invention is directed to a limited slip differential that limits the speed differentiation or "slip" between the driven wheels, and gradually increases torque to the non-slipping wheel, as the rotational speed difference between the slipping wheel and the non-slipping wheel increases. The rate of increase of the torque to the non-slipping wheel should increase, as the speed difference between the slipping wheel and the non-slipping wheel increases. The rate of increase of the torque applied to the non-slipping wheel should preferably increase at a greater rate than the rate of increase of the speed difference between the wheels. Torque transfer should be substantially zero or minimal between both driven wheels, when there is substantially no speed difference or slip between the driven wheels, since such torque transfer is not required when there is substantially no speed difference or slip between the driven wheels. The rate of increase of the torque applied to the non-slipping wheel should be adjustable by modifying physical characteristics of the limited slip differential. Such limited slip differentials should be inexpensive, durable, long lasting, easy to manufacture and install, either as an original equipment item or as a retrofit, easy to maintain, and require a minimum of maintenance.

The limited slip differential has a sealed casing containing a fluid medium that houses opposing output gears and a plurality of opposing pinions having substantially parallel rotational axes. The opposing pinions mesh one with the other at the medial portions of the opposing pinions in a circumferential manner, and lateral portions of the opposing pinions mesh with opposing output gears, which are affixed to opposing driven shafts. Meshing between opposing pinions one with the other and meshing between opposing pinions and the opposing output gears respectively, function as gear pumps, which pump the fluid medium in the presence of relative rotation between the opposing output gears. Fluid pressure build-up caused by the pumping action results in pumping resistance, and, thus, slip limitation at the opposing output shafts of the limited slip differential, especially at high rotational speed differences between the opposing output shafts. Partitions substantially centrally located on each opposing pinions provide fluid barriers between the medial and lateral portions of each of the pinions, and, thus, promote pressure build-up of the pumped fluid medium.

The opposing output gears and the opposing pinions may have either helical teeth or spur teeth. Bladders may be optionally incorporated into the casing to accommodate fluid volume changes inside the casing, as a result of temperature variations. The number of meshing points that function as gear pumps, resulting from the continuous circumferential pinion arrangement, markedly increases the slip limiting capacity of the limited slip differential of the present invention, as compared with other limited slip differentials.

A limited slip differential having features of the present invention comprises a casing containing a fluid medium, said casing rotatably driven along an axis by an input member; plurality of opposing pinions therein said casing that are immersed in said casing fluid medium, having substantially parallel rotational axes, said opposing pinions meshing one with the other circumferentially at medial portions of said meshing opposing pinions; said pinions having partitions therebetween lateral and said medial portions of each of said opposing pinions; opposing driven gears, immersed in sail casing fluid medium, said opposing driven gears meshing with a plurality of said lateral portions; said opposing driven gears having output shafts adjoined thereto; said casing having opposing holes therethrough, said opposing output shafts rotatably mounted therethrough; and seals adapted to retain said fluid medium therein said casing.

DRAWINGS

These and other features, aspects, and advantages of the present invention will become better understood with regard to the following description, appended claims, and accompanying drawings where:

FIG. 2 is a top view of the limited slip differential;

FIG. 3 is a perspective view of the limited slip differential;

FIG. 4 is a side view of the limited slip differential;

FIG. 5 is a cut-away perspective view of the limited slip differential;

FIG. 6 is a cut-away perspective view of a housing of the limited slip differential;

FIG. 7 is a cut-away perspective view of a casing of the limited slip differential;

FIG. 8 is a cut-away perspective view of a portion of the limited slip differential;

FIG. 9 is a fragmentary section view of the limited slip differential of FIG. 5;

FIG. 16A is a section view of a portion of the limited slip differential of FIG. 15 with the left output gear rotating clockwise, and an enlarged portion of a meshing zone;

FIG. 16B is a section view of a portion of the limited slip differential of FIG. 15 with the left output gear rotating counter-clockwise, an enlarged portion of the meshing zone, and enlarged portions of certain tooth-tip gaps;

Figure 24:
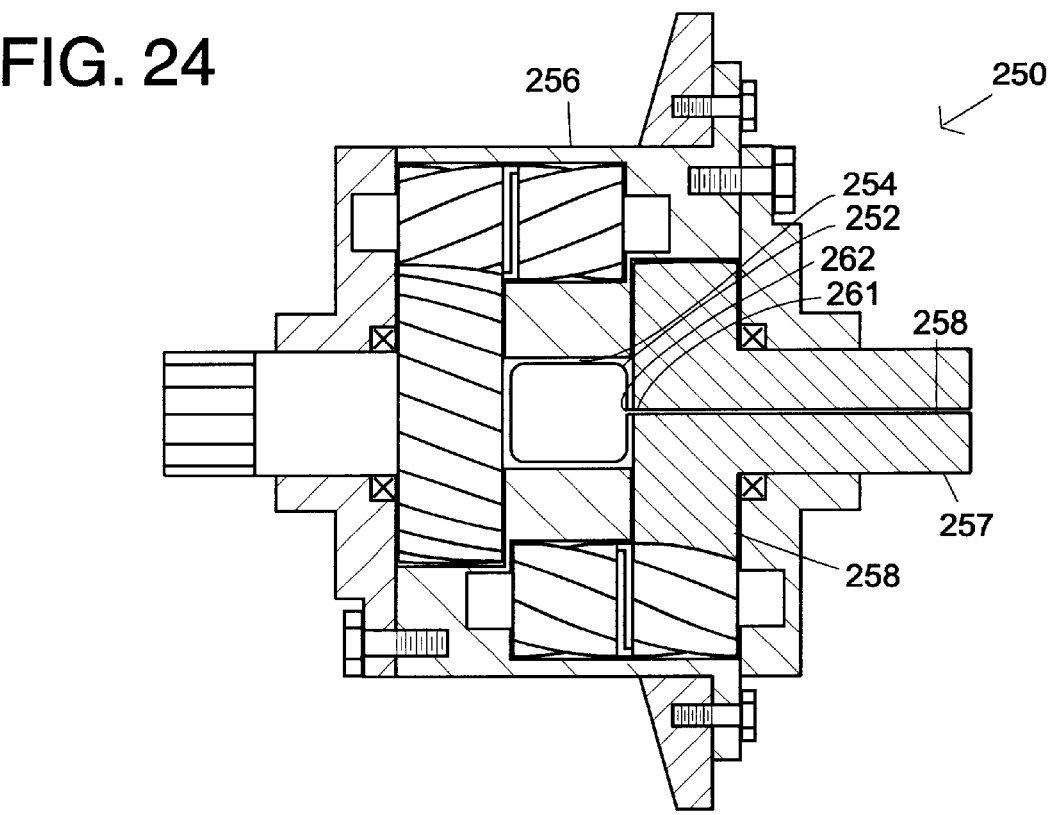
Figure 25:
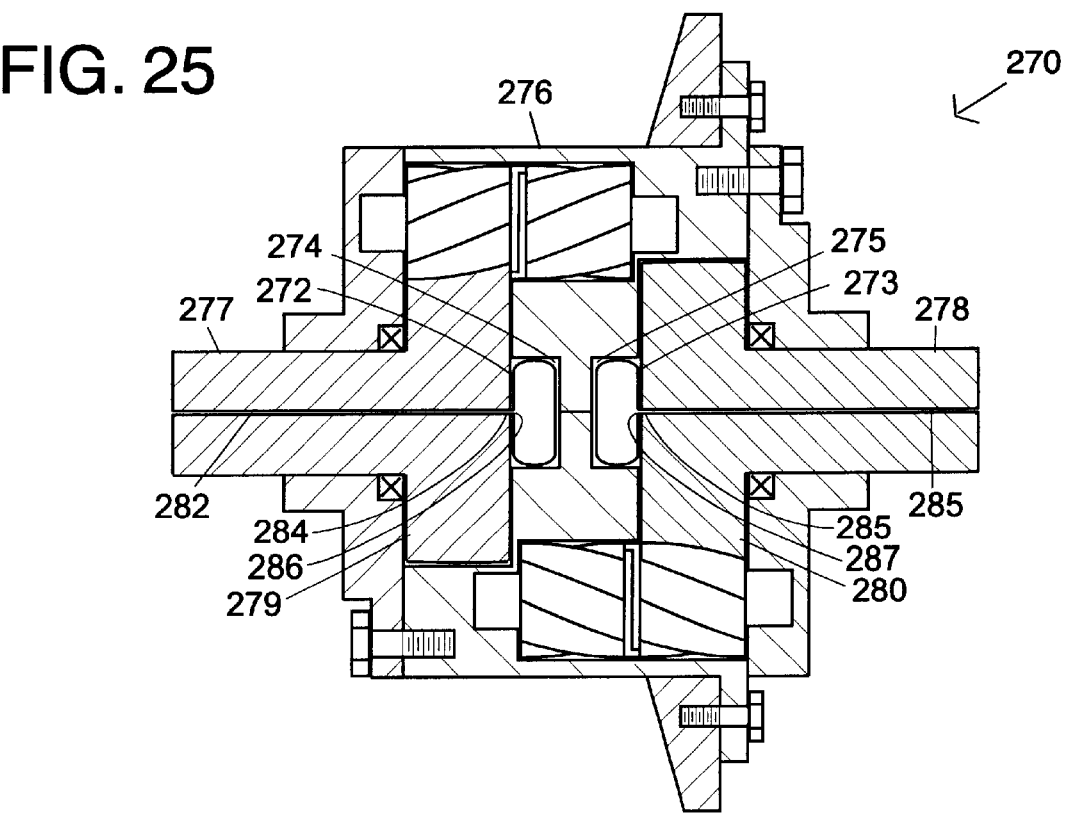

FIG. 24 is a section of a portion of an alternative embodiment of a limited slip differential having an alternative casing, having an expansion bladder and alternative output gear and output shaft; and FIG. 25 is a section of a portion of an alternative limited slip differential having an alternative casing, having two expansion bladders and alternative opposing output gears and opposing output shafts.

DESCRIPTION

The preferred embodiment of the present invention will be described with reference to FIGS. 1–25 of the drawings. Identical elements in the various figures are identified with the same reference numbers.

LIMITED SLIP DIFFERENTIAL

FIGS. 1–18 show an embodiment of the present invention, a limited slip differential 10 having a housing 12, an input shaft 14, and opposing driven shafts 16 and 18, the exterior of which is best shown in FIGS. 2–4. The input shaft 14 is rotatably supported in and substantially concentric with roller bearing 20, which is mounted on side 22 of the housing 12, the housing 12 having a hole 24 for mounting the roller bearing 20 therein. The housing 12 also has roller bearings 26 mounted on opposing ends 28 and 30 of the housing 12, the housing 12 having holes 32 for mounting the roller bearings 26 therein, as best shown in FIGS. 1 and 5–9.

Internal end 34 of the input shaft 14 has bevel gear 36 affixed thereto, which meshes with bevel ring gear 38 of casing 40, as best shown FIGS. 1, 5 and 8–9. The bevel ring gear 38 may be affixed to the casing 40 by bolts or other suitable means. The casing 40 is rotatably mounted internally to the housing 12 and has a casing body 42, which the bevel ring gear is affixed thereto, and casing ends 44 and 46, as best shown in FIGS. 1, 5, 7–9, 14 and 15. The casing ends 44 and 46 are affixed to the casing body 42 by bolts or other suitable means in a fluid tight manner and may have fluid seals, gaskets, or other suitable fluid retaining means (not shown) therebetween the casing body 42 and the casing ends 44 and 46. The casing ends 44 and 46 have collar bushings 48 and 49 integral therewith and have holes 50 and 51 concentrically therethrough. The opposing driven shafts 16 and 18 extend therethrough the holes 50 and 51. The opposing driven shafts 16 and 18 are rotatably supported in and substantially concentric with the collar bushings 48 and 49, the collar bushings 48 and 49, respectively, being rotatably supported in and substantially concentric with the roller bearings 26 on the opposing ends 28 and 30 of the housing 12. External ends 52 and 53 of the opposing driven shafts 16 and 18, as best shown in FIG. 10, may have optional external splines 54, and internal ends 55 and 56 of the opposing driven shafts 16 and 18, respectively, have gears 57 and 58, respectively, affixed thereto.

Figure 10:
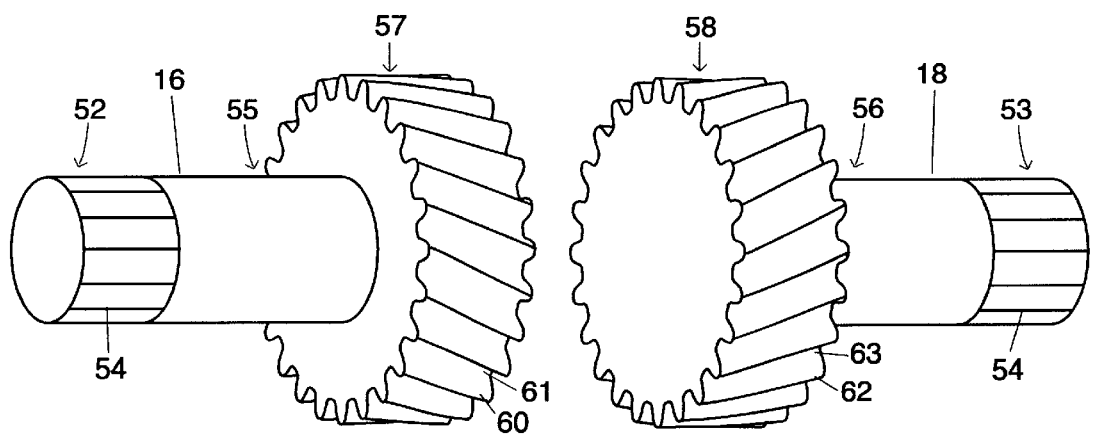
FIG. 10 is a perspective view of opposing output gears and output shafts of the limited slip differential.
Figure 11A:
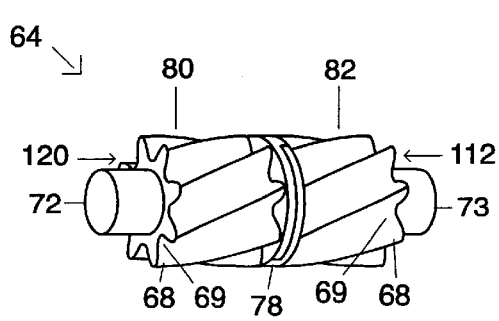
FIG. 11A is a perspective view of a left pinion and a pair of partition sub units of the limited slip differential.
Figure 11B:
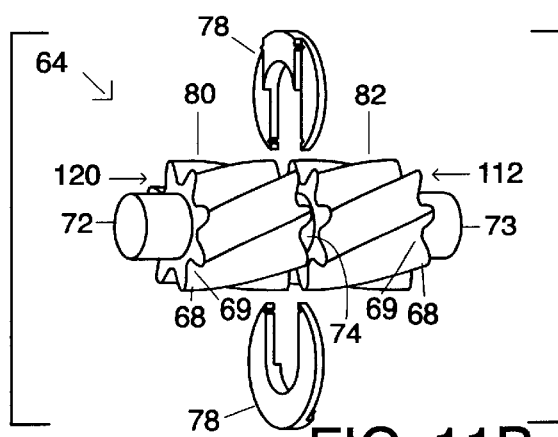
FIG. 11B is an exploded perspective view of the left pinion and the pair of partition sub units of the limited slip differential of FIG. 11A.
Figure 12A:
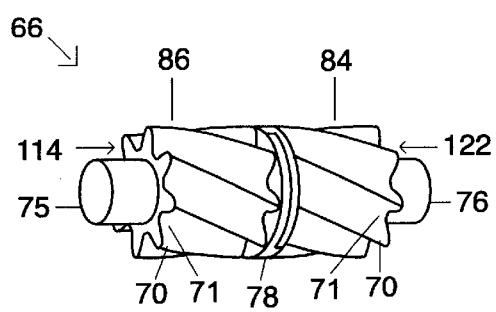
FIG. 12A is a perspective view of a right pinion and a pair of partition sub units of the limited slip differential.
Figure 12B:
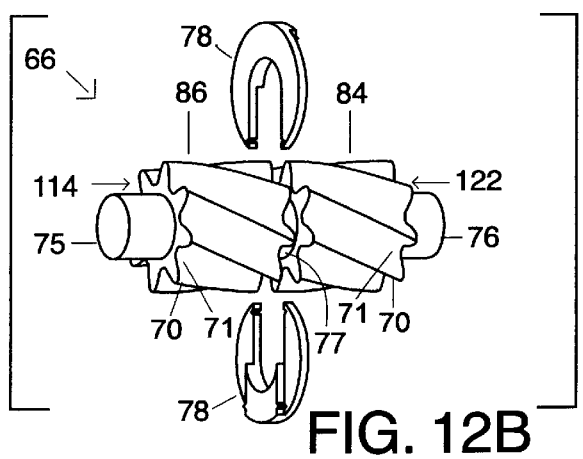
FIG. 12B is an exploded perspective view of the right pinion and the pair of partition sub units of the limited slip differential of FIG. 12A.

The gear 57, as best shown in FIG. 10, has helical teeth 60 spaced evenly one with the other, having troughs 61 in between the helical teeth 60. The gear 58 has helical teeth 62 also spaced evenly one with the other, having troughs 63 in between the helical teeth 62, respectively. The troughs 61 and 63 are considered to be and hereinafter called left output gear tooth space 61 and right output gear tooth space 63. The gears 57 and 58 are considered to be and hereinafter called the opposing helical output gears 57 and 58, respectively. The opposing helical output gears 57 and 58 have opposing direction helical teeth 60 and 62, respectively, each of which mesh with a plurality of opposing pinions 64 and 66, respectively, having opposing direction helical teeth, respectively, as best shown in FIGS. 11A, 11B, 12A, and 12B, which are opposing to the direction of the helical teeth 60 and 62, respectively. The helical output gear 57 meshes with the plurality of pinions 64 one with the other, each of the pinions 64 meshing with a pair of adjacent ones of the pinions 66. The helical output gear 58 meshes with the plurality of pinions 66 one with the other, each of the pinions 66 meshing with a pair of adjacent ones of the pinions 64. The pinions 64 have teeth 68, which are evenly spaced around each of the pinions 64, and troughs 69 situated therebetween the teeth 68. The pinions 66 have teeth 70, which are evenly spaced around each of the pinions 66, and troughs 71 situated therebetween the teeth 70. The opposing troughs 69 and 71 are considered to be and hereinafter called left pinion tooth space 69 and right pinion tooth space 71, respectively. The opposing pinions 64 and 66 have teeth 68 and 70, respectively, directionally opposing one another.

The opposing helical output gears 57 and 58 have opposing direction helical teeth 60 and 62, respectively, the opposing direction helical teeth 60 and 62 being defined by the handedness of the helical teeth 60 and 62, as in a right hand screw having right hand direction threads and a left hand screw having left hand direction threads. Thus, if the driven shaft 16 is considered to be and hereinafter called the left output shaft 16, and the driven shaft 18 is considered to be and hereinafter called the right output shaft 18, then the opposing helical output gears 57 and 58 are considered to be and hereinafter called the left and right helical output gears 57 and 58, respectively, and the opposing direction helical teeth 60 and 62 are considered to be and hereinafter called the right and left handed helical teeth 60 and 62, respectively. The left and right helical output gears 57 and 58, thus have the right handed teeth 60 and left handed helical teeth 62, respectively. The pinions 64 may then be considered to be and hereinafter called the left pinions 64, and the pinions 66 may then be considered to be and hereinafter called the right pinions 66, respectively. The left pinions 64 and the right pinions 66 have the teeth 68 and 70 directionally opposing one another, respectively. The teeth 68 and 70 may then be considered to be and hereinafter called the left handed helical teeth 68 and the right handed helical teeth 70, respectively. The left and right helical output gears 57 and 58 have the right and left hand helical teeth 60 and 62, respectively, each of which mesh with a plurality of the left pinions 64 and the right pinions 66, respectively.

Figure 13A:
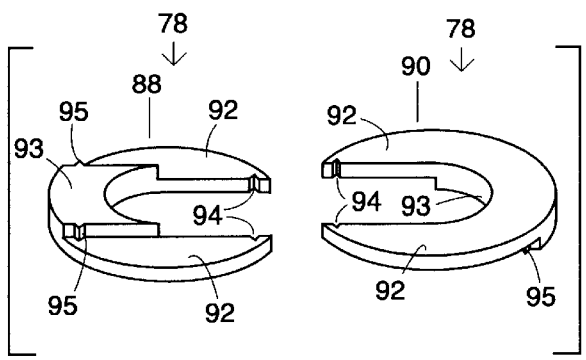
FIG. 13A is an exploded perspective view of the partition sub units of the limited slip differential.
Figure 13B:
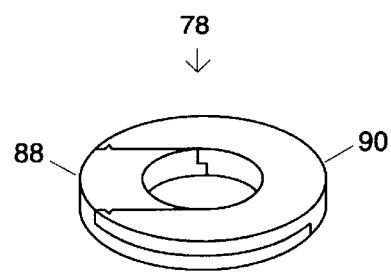
FIG. 13B is a perspective view of the partition sub units of the limited slip differential.

In summary, as best shown in FIGS. 1, 5, 8–9, and 15–17C, the left helical output gear 57 has the right hand helical teeth 60, the right helical output gear 58 has the left hand helical teeth 62, the left pinions 64 then have the left hand helical teeth 68, and the right pinions 66 then have the right hand helical teeth 70, the left helical output gear 57 meshes with the left pinions 64, which mesh with a pair of the adjacent right pinions 66, and the right helical output gear 58 meshes with the right pinions 66, which mesh with a pair of the adjacent left pinions 64. The left pinions 64 and the right pinions 66 have substantially the same outer diameters, each of the left pinions 64 have substantially the same outer diameter as one another, and each of the right pinions 66 have substantially the same outer diameter as one another. Each of the left pinions 64 have opposing ends shafts 72 and 73 and a substantially centrally located center shaft 74. Each of the right pinion 66 have opposing ends shafts 75 and 76 and a substantially centrally located center shaft 77. Each of the left pinions 64 and each of the right pinions 66 have a partition 78 mounted adjacent and surrounding each of the center shafts 74 and 77, the partitions 78 fitting snugly between lateral and medial portions 80 and 82 of the left pinions 64, respectively, and lateral and medial portions 84 and 86 of the right pinions 66, respectively. The outer diameters of the partitions 78 are substantially the same as the outer diameters of the left pinions 64 and the right pinions 66, the partitions 78 having inner diameters which allow the partitions 78 to fit snugly about the center shafts 74 and 77. Each of the partitions 78 have substantially identical C-shaped mating partition sub units 88 and 90, as best shown in FIGS. 13A and 13B, each of the partition sub units 88 and 90 having substantially the same keyed shape with side portions 92 and raised base portion 93. The side portions 92 have opposing indentations 94, and the raised base portion 93 has opposing nibs 95, which mate and interlock one with the other, and are retained therebetween the lateral and medial portions 80 and 82 of the left pinions 64, respectively, and therebetween the lateral and medial portions 84 and 86 of the right pinions 66, respectively. The left pinions 64 and the right pinions 66 are best shown in FIGS. 11A, 11B, 12A, and 12B, and the partitions 78 are best shown in FIGS. 11A, 11B, 12A, 12B, 13A, and 13B. The left pinions 64, the right pinions 66, and the partitions 78 also being shown in FIGS. 1, 5, 8, 9, and 15.

The casing body 42, as best shown in FIGS. 1, 5, 7–9, and 14–17C, has opposing output gear accommodation chambers 96 and 98, considered to be and hereinafter called the left and right output gear accommodation chambers 96 and 98, respectively, which accommodate the left helical output gear 57 and the right helical output gear 58, respectively. The casing body 42 also has pinion accommodations 100 and 102 and pinion end shaft accommodations 104 and 106 on opposing sides 108 and 110 of the casing body 42, considered to be and hereinafter called the left and right pinion accommodations 100 and 102, respectively, and the left and right pinion end shaft accommodations 104 and 106, respectively. Each of the left pinion accommodations 100 accommodates a left one of the left pinions 64, and each of the right pinion accommodations 102 accommodates a right one of the right pinions 66.

Each of the left pinion shaft accommodations 104 accommodates one of the end shafts 73 of a medial end 112 of one of the left pinions 64, and each of the right pinion shaft accommodations 106 accommodates one of the end shafts 75 of a medial end 114 of one of the right pinions 66. The casing ends 44 and 46 considered to be and hereinafter called the left and right casing ends 44 and 46 each have left and right end casing pinion shaft accommodations 116 and 118, respectively. Each of the left end casing pinion shaft accommodations 116 accommodates one of the end shafts 72 of a lateral end 120 of one of the left pinions 64, and each of the right end casing pinion shaft accommodations 118 accommodates one of the end shafts 16 of a lateral end 122 of one of the right pinions 66. The left and right casing ends 44 and 46 have fluid seal accommodations 124 and 125 and fluid seals 126 and 127, concentrically mounted therein the fluid seal accommodations 124 and 125, respectively, adjacent and concentric therewith the collar bushings 48 and 49, respectively.

Figure 1:
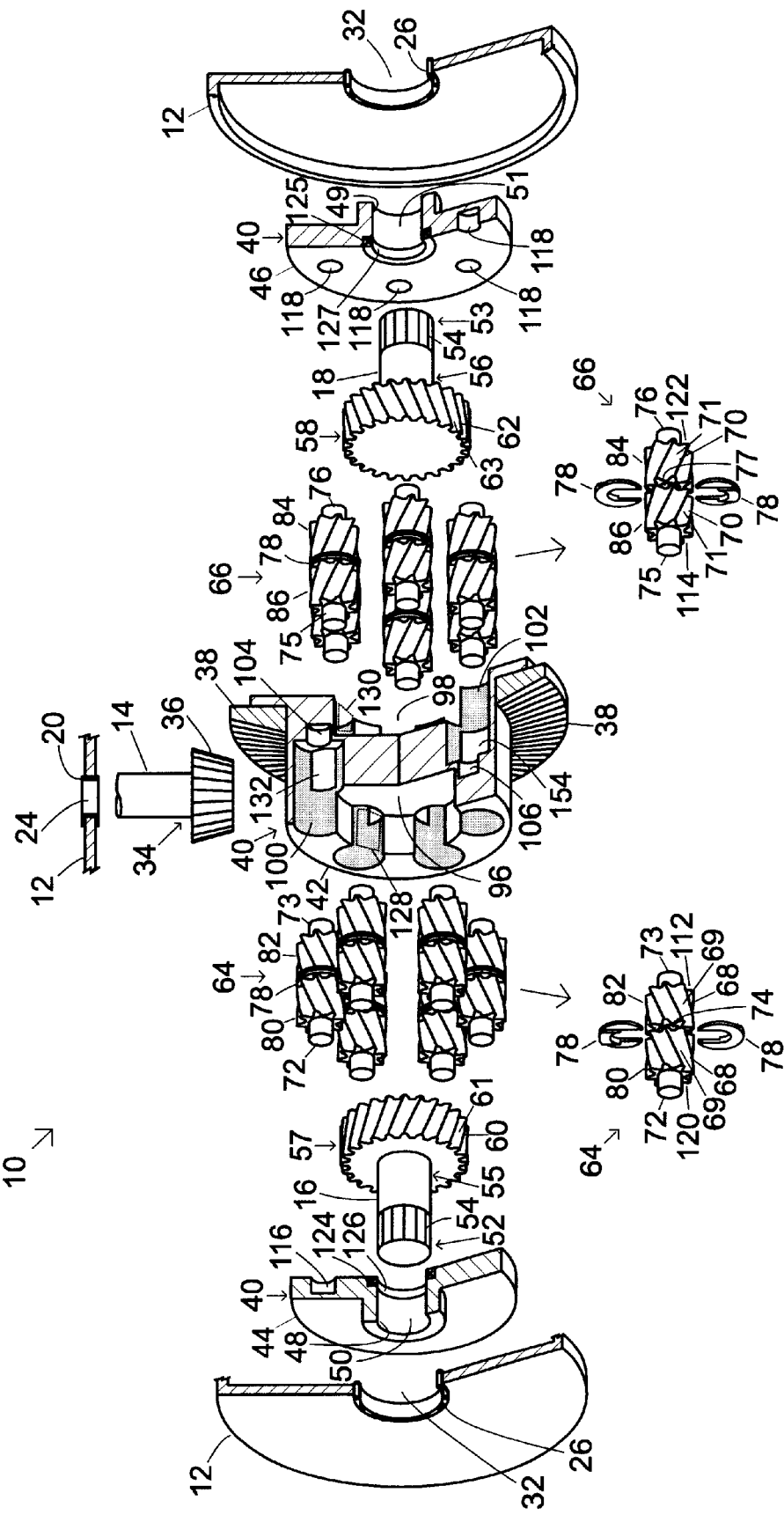
FIG. 1 is an exploded cut-away perspective view of a limited slip differential, constructed in accordance with the present invention.
Figure 14:
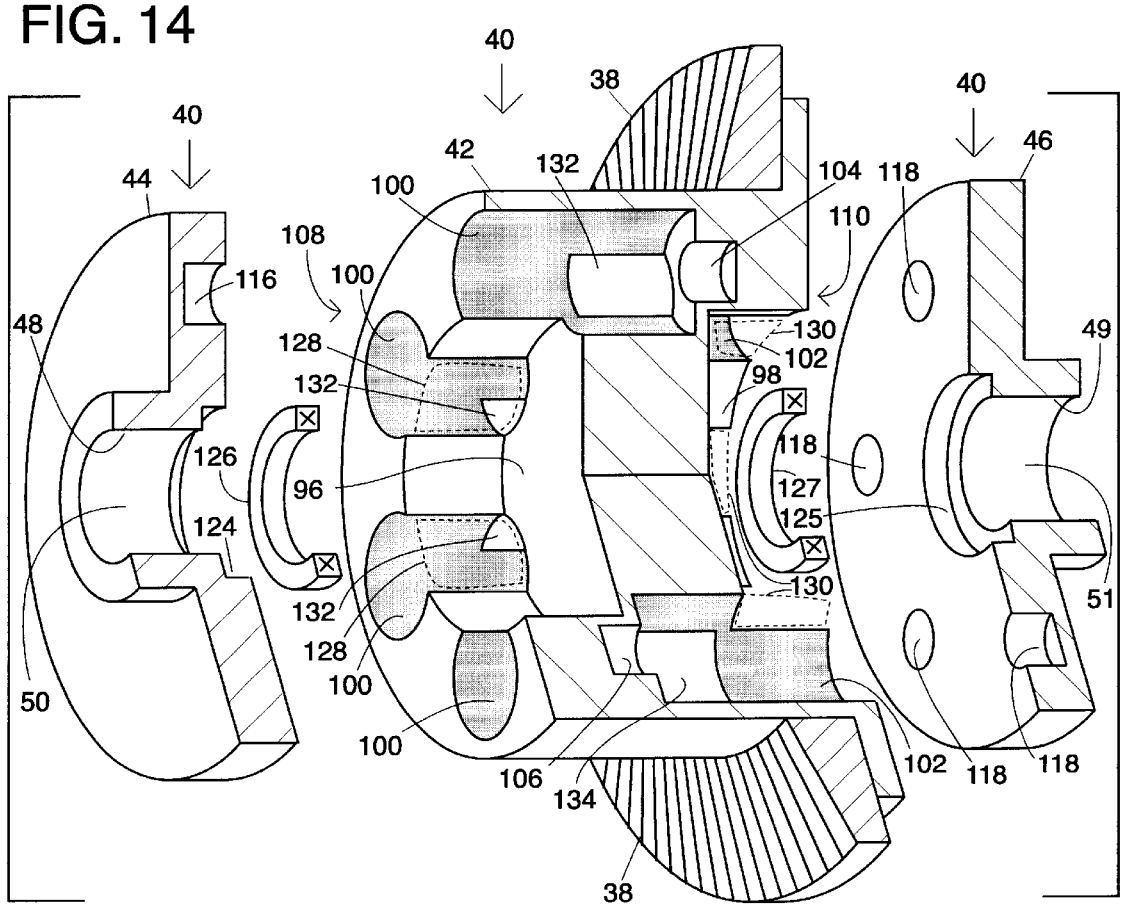
FIG. 14 is an exploded cut-away perspective view of the casing of the limited slip differential.

Each of the left pinion accommodations 100, as best shown in FIGS. 1, 7, and 14 has a cut-away portion 128 adjacent the left output gear accommodation chamber 96, hereinafter called a left output meshing window 128, a portion of the left pinion 64 extending therethrough and meshing with the left helical output gear 57, and each of the right pinion accommodations 102 has a cut-away portion 130 adjacent the right output gear accommodation chamber 96, hereinafter called a right output meshing window 130, a portion of the right pinion 66 extending therethrough and meshing with the right helical output gear 58.

Each of the left pinion accommodations 100 also has two cut-away portions 132, each of the cutaway portions 132 adjacent one of the right pinion accommodations 102, hereinafter called left pinion meshing windows 132, a portions of the left pinion 64 extending therethrough each of the left meshing windows 132 and meshing with two of the right pinions 66. Each of the right pinion accommodations 102 also has two cut-away portions 134, each of the cutaway portions 134 adjacent one of the left pinion accommodations 100, hereinafter called right pinion meshing windows 134, a portion of the right pinion 66 extending therethrough and meshing with one of the left pinions 64.

The lateral portions 80 of the left pinions 64, thus, mesh with the left helical output gear 57, and the lateral portions 84 of the right pinions 66, thus, mesh with the right helical output gear 58. The medial portions 82 of the left pinions 64, thus, mesh with the medial portions 86 of the right pinions 66, and vice versa.

The casing 40 is filled with fluid medium, such as an automotive transmission oil fluid or other suitable liquid, preferably being substantially incompressible under the temperatures and operating conditions that the limited slip differential 10 operates therein. The left pinions 64, right pinions 66, left helical output gear 57, and right helical output gear 58 are immersed in said casing fluid medium.

MESHING ZONES, PRESSURE ZONES AND PUMPING ACTION

The limited slip differential 10 has pressure zones similar to pressure zones in a typical automotive oil pump of the external gear type, which result from meshing between a driven gear and an idler gear of a typical automotive oil pump. Pumping action to the fluid medium of the limited slip differential 10 has some degree of resistance in which the resistance to the pumping action is used to limit the speed difference or slip between the left and right output shafts 16 and 18, respectively, of the limited slip differential 10. The speed difference between the left and right output shafts 16 and 18, respectively, causes the left and right helical pinions 64 and 66 to rotate along their respective axes inside the casing 40. This causes the lateral portions 80 of the left pinions 64 to mesh 140 with the left output gear 57; the medial portions 82 of the left pinions 64 mesh 141 with the medial portions 86 of the right pinions 66; and the lateral portions 84 of the right pinions 66 mesh 142 with the right output gear 58, each of the meshing actions 140, 142, and 143, respectively, produces a pumping effect to the fluid medium, as best shown in FIGS. 15, 16A, 16B, 16C, 17A, 17B, and 17C.

Figure 16C:
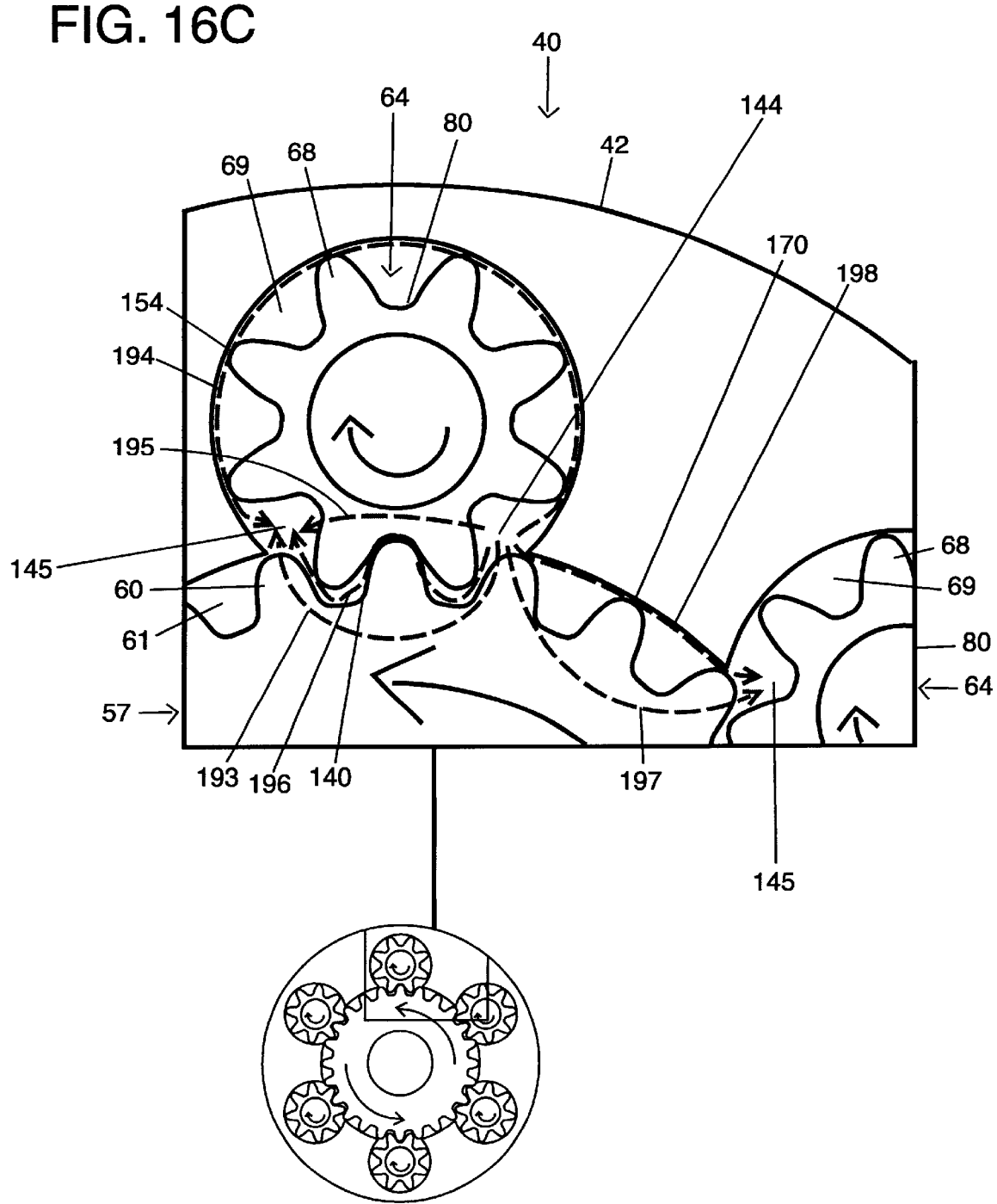
FIG. 16C is a section view of a portion of the limited slip differential of FIG. 15, showing typical fluid flow paths.

The meshing action 140 therebetween the lateral portions 80 of the left pinions 64 and the left output gear 57, as best shown in enlarged top portions of FIGS. 16A, 16B, and 16C, are considered to be and hereinafter called left lateral meshing zones 140. Each of the left lateral meshing zones 140 has pressure zones, which are similar to pressure zones in a typical automotive oil pump, which result from the pumping of oil in the automotive oil pump. Each of the left lateral meshing zones 140 has one of the high-pressure zones 144 adjacent one side of the adjacent teeth 68 and 60, at which the adjacent teeth 68 and 60 of the left pinions 64 and the left output gears 57, respectively, mesh and move toward one another and displace the fluid medium. Each of the left lateral meshing zones 140 also has one of the low-pressure zones 145 on an opposing side of and adjacent the adjacent teeth 68 an 60, at which the meshing teeth 68 and 60 of the left pinions 64 and left output gears 57, respectively, move away from one another and create a vacuum that draws-in the fluid medium. The locations of the high-pressure zones 144 and the low-pressure zones 145 are reversible, and are dependent upon the rotational directions of the left pinions 64 and the left output gears 57. If the left output gear 57 turns clockwise with respect to the casing 40, one of the high-pressure zones 144, as best shown in enlarged top portion of FIG. 16A, is located to the left side of one of the left lateral meshing zones 140 and one of the low pressure zones 145 is located at the right side of one of the left lateral meshing zones 140. If, on the other hand, the left output gear 57 turns counter-clockwise with respect to the casing 40, the locations of the high pressure zones 144 and the low pressure zones 145 are reversed, as best shown in enlarged top portion of FIG. 16B, such that one of the high-pressure zones 144 is now on the right side of one of the left lateral meshing zones 140 and one the low pressure zones 145 is now on the left side of one of the left lateral meshing zones 140.

Figure 17A:
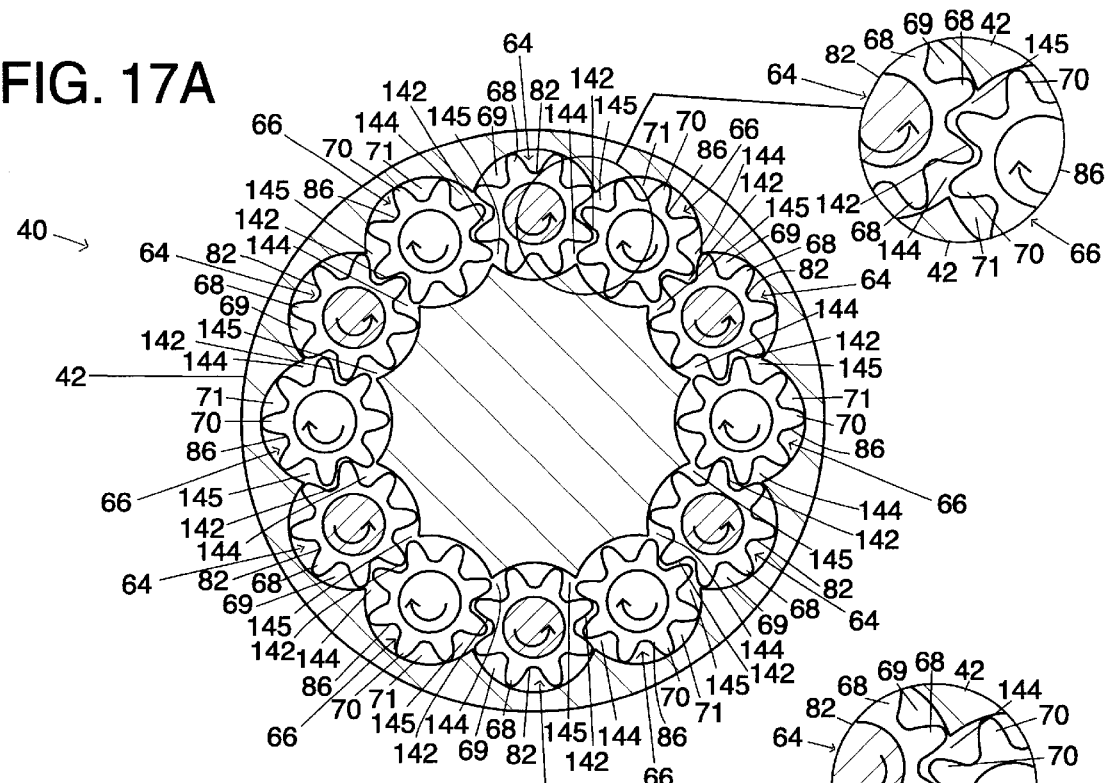
FIG. 17A is a section view of another portion of the limited slip differential of FIG. 15 with the left pinions rotating counter-clockwise, and an enlarged portion of a meshing zone.
Figure 17B:
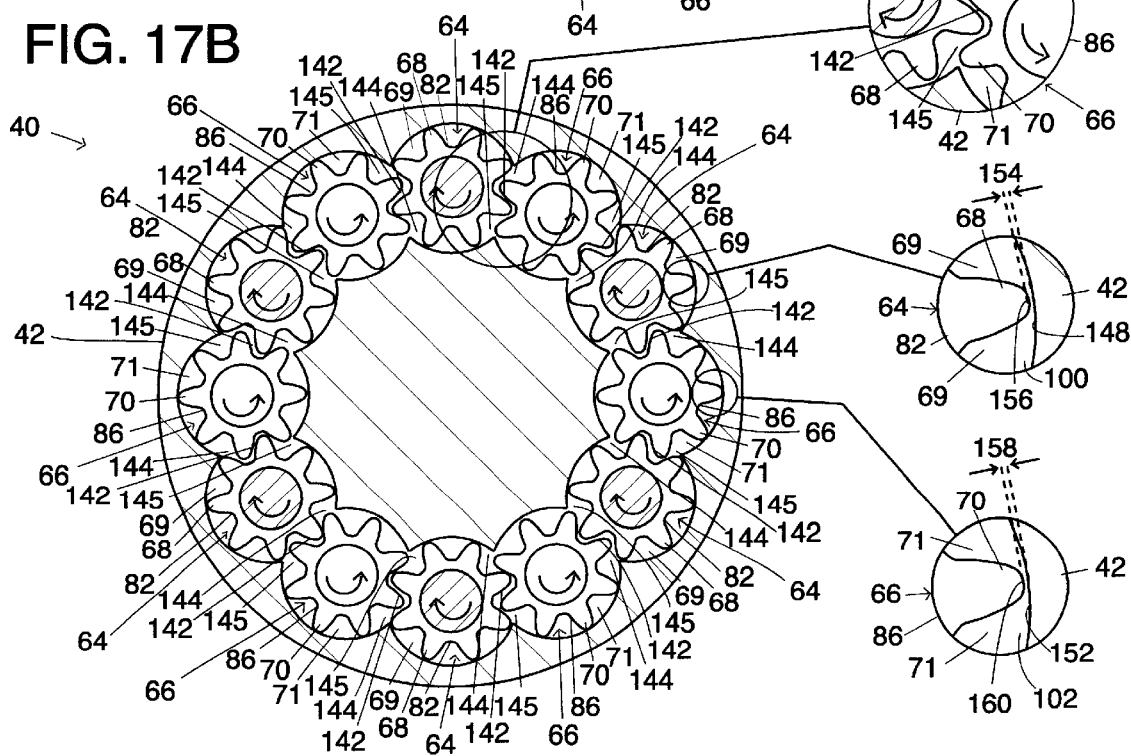
FIG. 17B is a section view of a portion of the limited slip differential of FIG. 15 with the left pinions rotating clockwise, an enlarged portion of the meshing zone, and enlarged portions of certain tooth-tip gaps.
Figure 17C:
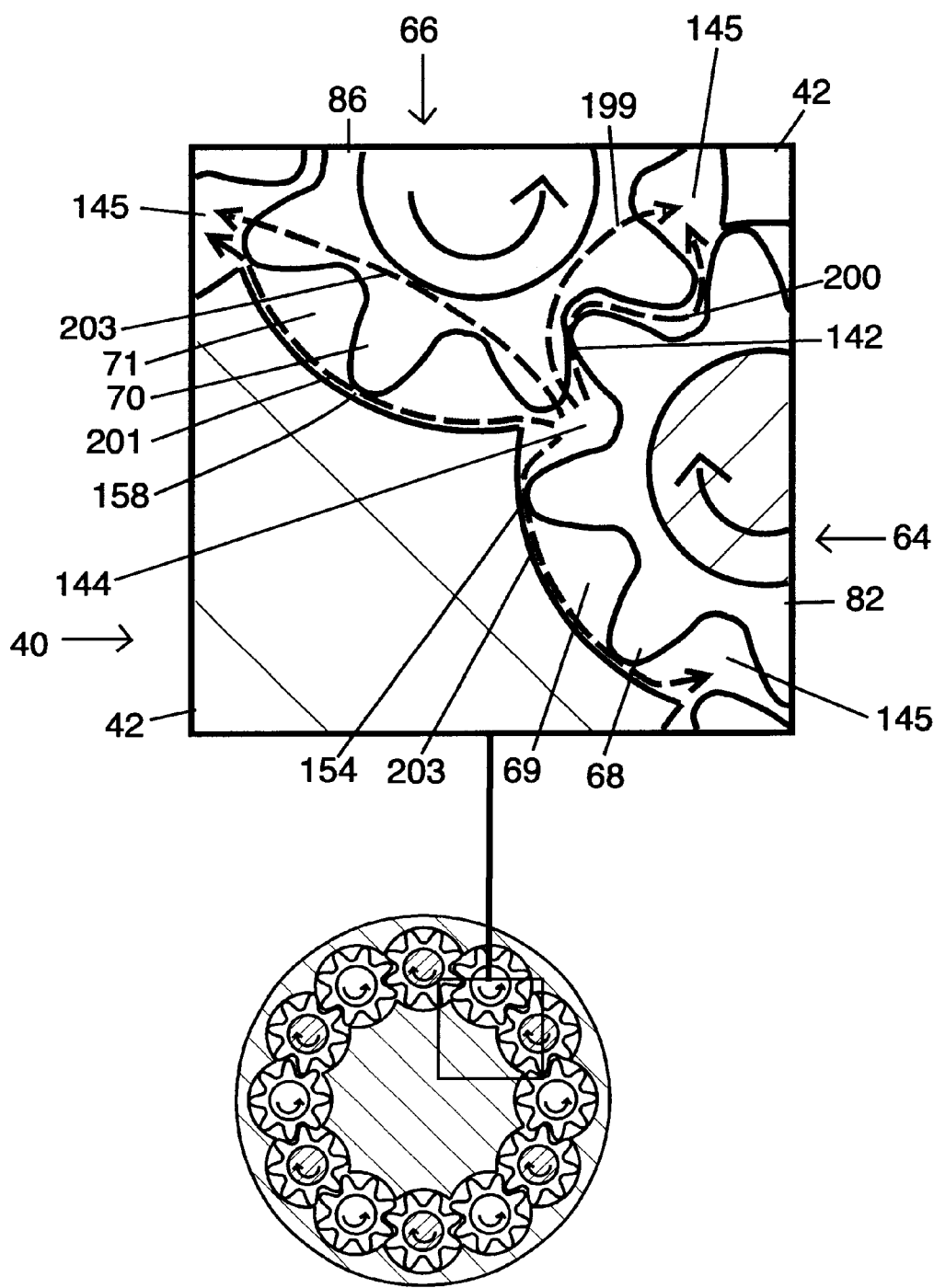
FIG. 17C is a section view of a portion of the limited slip differential of FIG. 15, showing typical fluid flow paths.

The meshing action 142 therebetween the left and right pinions 64 and 66 at the medial portions 82 and 86, as best shown in enlarged top portions of FIGS. 17A, 17B, and 17C, are considered to be and hereinafter called medial meshing zones 142. Each of the medial meshing zones 142 has pressure zones, which are similar to pressure zones in atypical automotive oil pump, which result from the pumping of oil in the automotive oil pump. Each of the medial meshing zones 142 has one of the high-pressure zones 144 adjacent one side of the adjacent teeth 68 and 70, at which the adjacent teeth 68 and 70 of the left pinions 64 and the right pinion 66, respectively, mesh and move toward one another and displace the fluid medium. Each of the medial meshing zones 142 has one of the low-pressure zones 145 on an opposing side of and adjacent the adjacent teeth 68 an 70, at which the meshing teeth 68 and 70 of the left pinions 64 and right pinions 66, respectively, move away from one another and create a vacuum that draws-in the fluid medium. The locations of the high-pressure zones 144 and the low-pressure zones 145 are reversible, and are dependent upon the rotational directions of the left pinions 64 and the right pinions 66. If the right pinions 66 turn clockwise with respect to the casing 40, one of the high-pressure zones 144, as best shown in enlarged top portion of FIG. 17A, is located below one of the medial meshing zones 142 and one of the low pressure zones 145 is located above one of the medial meshing zones 142. If, on the other hand, the right pinions 66 turn counter-clockwise with respect to the casing 40, the locations of the high pressure zones 144 and the low pressure zones 145 are reversed, as best shown in enlarged top portion of FIG. 17B, such that one of the high-pressure zones 144 is now above one of the medial meshing zones 142 and one the low pressure zones 145 is now below one of the medial meshing zones 142.

Figure 15:
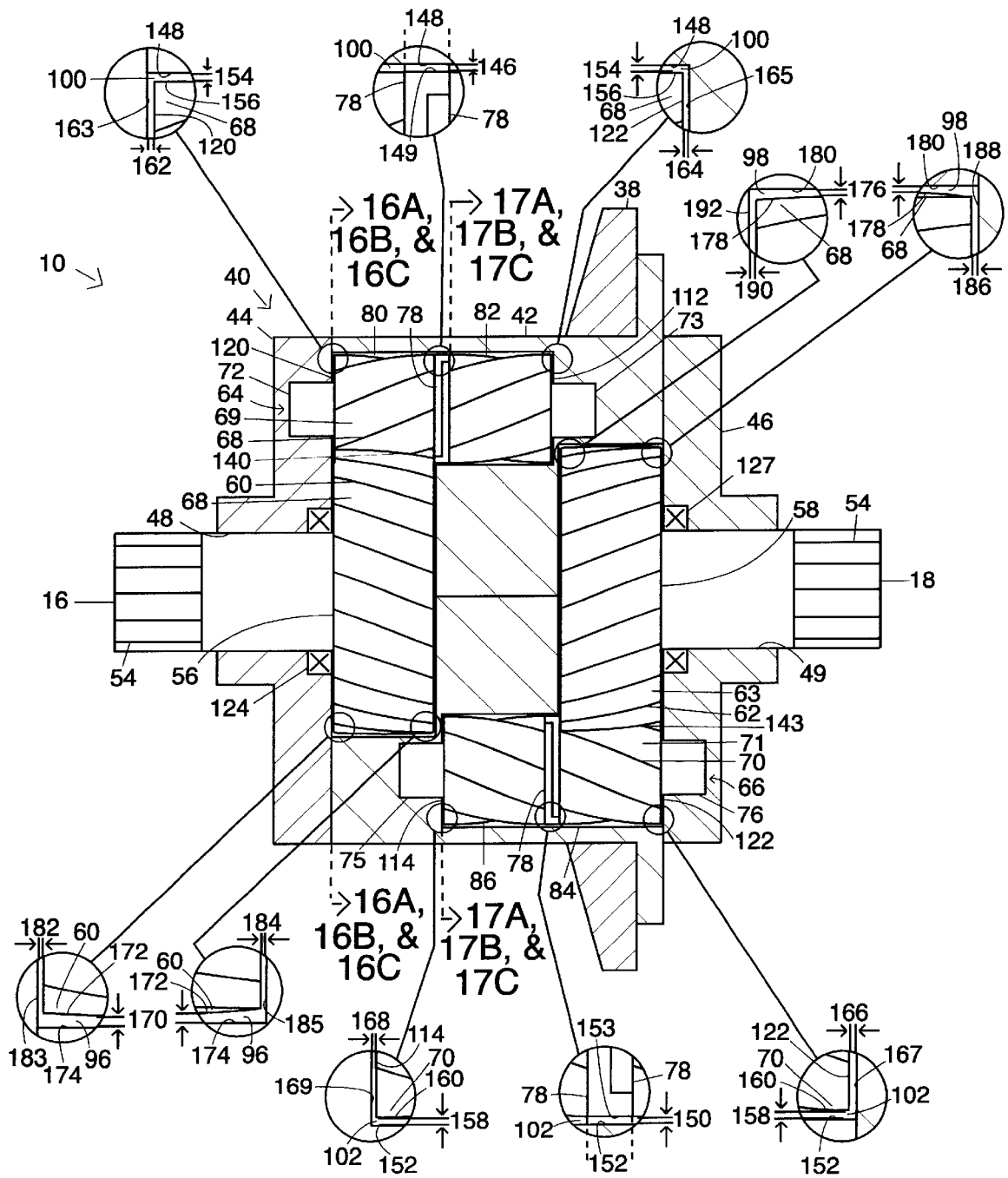
FIG. 15 is a fragmentary section view of the limited slip differential of FIG. 8 and enlarged portions of fluid flow-restricting gaps.

The meshing action 143 therebetween the lateral portions 84 of the right pinions 66 and the right output gear 58, are considered to be and hereinafter called right lateral meshing zones 143, as best shown in FIG. 15. Each of the right lateral meshing zones 143 (not clearly shown but similar to that of the left lateral meshing zones 140 in FIGS. 16A–16C) has pressure zones, which are similar to the pressure zones in a typical automotive oil pump, which result from the pumping of oil in the automotive oil pump. Each of the right lateral meshing zones 143 has one of the high-pressure zones adjacent one side of the adjacent teeth 62 and 70, at which the adjacent teeth 62 and 70 of the right output gear 58 and the right pinions 66, respectively, mesh and move toward one another and displace the fluid medium. Each of the right lateral meshing zones 143 also has one of the low-pressure zones zones on an opposing side of and adjacent the adjacent teeth 62 an 70, at which the meshing teeth 62 and 70 of the right output gear 58 and right pinions 66, respectively, move away from one another and create a vacuum that draws-in the fluid medium. The locations of the high-pressure zones and the low-pressure zones at the right lateral meshing zones 143 are also reversible, and are dependent upon the rotational directions of the right output gear 58 and the right pinions 66.

GAPS THAT ALLOW RESTRICTED FLUID FLOW

The fluid medium has a natural tendency to move from each of the localized high-pressure zones 144 to each of the adjacent respective localized low-pressure zones 145. The fluid medium finds its way through paths of least resistance. The limited slip differential 10 however has a number of gaps that allow restricted flow of the pumped fluid medium. Without the partitions 78 at the left and the right pinions 64 and 66 respectively, the fluid medium would otherwise flow freely between the medial portions 82 and the lateral portions 80 of the left pinions 64 and between the medial portions 86 and the lateral portions 84 of the right pinions 66. The partitions 78 partially block fluid flow and act as a partial fluid barrier between the medial portions 82 and the lateral portions 80 of the left pinions 64 and between the medial portions 86 and the lateral portions 84 of the right pinions 66.

As best shown in FIG. 15, the limited slip differential 10 has a left pinion partition gap 146 therebetween circumferential wall 148 of each of the left pinion accommodations 100 and peripheral wall 149 of each of the partitions 78 of the left pinions 64. Each of the left pinion partition gaps 146 allows restricted fluid flow therebetween the lateral and the medial portions 80 and 82 of the left pinions 64. The limited slip differential 10 also has a right pinion partition gap 150 therebetween circumferential wall 152 of each of the right pinion accommodations 102 and peripheral wall 153 of each of the partitions 78 of the right pinions 66. Each of the right pinion partition gaps 150 allow restricted fluid flow therebetween the lateral and the medial portions 84 and 86 of the right pinions 66, respectively. The left pinion partition gaps 146 and the right pinion partition gaps 150 are considered to be and hereinafter called partition clearances 146 and 150, respectively.

The limited slip differential 10, as best shown in FIGS. 15, 16B, and 17B, has a left pinion tooth-tip gap 154 therebetween the circumferential wall 148 of each of the left pinion accommodations 100 and each of tips 156 of the helical teeth 68 of the lateral and the medial portions 80 and 82, respectively, of the left pinions 64. Each of left pinion tooth-tip gaps 154 allows restricted fluid flow from one of the left pinion tooth spaces 69 to the other adjacent one of the left pinion tooth spaces 69. The limited slip differential 10, as best shown in FIG. 17B, also has a right pinion tooth-tip gap 158 therebetween the circumferential walls 152 of each of the right pinion accommodations 102 and each of tips 160 of the helical teeth 70 of the lateral and the medial portions 84 and 86, respectively, of the left pinions 66. Each of the right pinion tooth-tip gaps 158 allows restricted fluid flow from one of the right pinion tooth spaces. 71 to the other adjacent one of the right pinion tooth space 71. The left pinion tooth-tip gaps 154 and right pinion tooth-tip gaps 158 are considered to be and hereinafter called tooth-tip clearances 154 and 158 respectively.

As best shown in FIG. 15, the limited slip differential 10 has a left pinion lateral axial gap 162 therebetween the lateral end 120 of each of the left pinions 64 and lateral wall 163 of each of the left pinion accommodations 100. Each of the left pinion lateral axial gaps 162 allows restricted fluid flow along the lateral wall 163 of each of the left pinion accommodations 100. The limited slip differential 10 also has a left pinion medial axial gap 164 therebetween the medial end 122 of each of the left pinions 64 and medial wall 165 of each of the left pinion accommodations 100. Each of the left pinion medial axial gaps 164 allows restricted fluid flow along the medial wall 165 of each of the left pinion accommodations 100.

As best shown in FIG. 15, the limited slip differential 10 has a right pinion lateral axial gap 166 therebetween the lateral end 122 of each of the right pinions 66 and lateral wall 167 of each of the right pinion accommodations 102. Each the right pinion lateral axial gaps 166 allows restricted fluid flow along the lateral wall 167 of each of the left pinion accommodations 102. The limited slip differential 10 also has a right pinion medial axial gap 168 therebetween the medial end 114 of each of the right pinions 66 and medial wall 169 of each of the right pinion accommodations 102. Each of the right pinion medial axial gaps 168 allows restricted fluid flow along the medial wall 169 of each of the left pinion accommodations 102. The left pinion lateral axial gaps 162, the left pinion medial axial gaps 164, the right pinion lateral axial gaps 166, and the right pinion medial axial gaps 168 are considered to be and hereinafter called axial clearances 162, 164, 166, and 168 respectively.

The limited slip differential 10, as best shown in FIGS. 15 and 16B, has a left output gear tooth-tip gap 170 therebetween each of tips 172 of the helical teeth 60 of the left output gear 57 and circumferential wall 174 of the left output gear accommodation chamber 96. Each of the left output gear tooth-tip gaps 170 allows restricted fluid flow from one of the left output gear tooth spaces 69 to the other adjacent one of the left output gear tooth space 69. The limited slip differential 10, as best shown in FIG. 15, also has a right output gear tooth-tip gap 176 therebetween each of tips 178 of the helical teeth 62 of the right output gear 58 and circumferential wall 180 of the right output gear accommodation chamber 98. Each of the right output gear tooth-tip gaps 176 also allows restricted fluid flow from one of the right output gear tooth spaces 71 to the other adjacent one of the left output gear tooth spaces. The left output gear tooth-tip gaps 170 and the right output gear tooth-tip gaps 176 are considered to be and hereinafter called tooth-tip clearances 170 and 176 respectively.

As best shown in FIG. 15, the limited slip differential 10 has a left output gear lateral axial gap 182 therebetween the left output gear 57 and lateral wall 183 of the left output gear accommodation chamber 96. The left output gear lateral axial gap 182 allows restricted fluid flow along the lateral wall 183 of the left output gear accommodation chamber 96. The limited slip differential 10 also has a left output gear medial axial gap 184 therebetween the left output gear 57 and medial wall 185 of the left output gear accommodation chamber 96. The left output gear medial axial gap 184 allows restricted fluid flow along the medial wall 185 of the left output gear accommodation chamber 96.

As best shown in FIG. 15, the limited slip differential 10 also has a right output gear lateral axial gap 186 therebetween the right output gear 58 and lateral wall 188 of the right output gear accommodation chamber 98. The right output gear lateral axial gap 186 allows restricted fluid flow along the lateral wall 188 of the right output gear accommodation chamber 98. The limited slip differential 10 also has a right output gear medial axial gap 190 therebetween the right output gear 58 and medial wall 192 of right output gear accommodation chamber 98. The right output gear medial axial gap 190 allows restricted fluid flow along the medial wall 192 of the right output gear accommodation chamber 98. The left output gear lateral axial gap 182, the left output gear medial axial gap 184, the right output gear lateral axial gap 186 and the right output gear medial axial gap 190 are also considered to be and hereinafter called axial clearances 182, 184, 186, and 188, respectively.

Restricted fluid flow can also occur at the left lateral meshing zones 140, medial meshing zones 142, and right lateral meshing zones 143. The left lateral meshing zones 140, medial meshing zones 142, and right lateral meshing zones 143 are considered to be and hereinafter simply called meshing zones 140, 142, and 143, respectively. The partition clearances 146 and 150; the tooth-tip clearances 154, 158, 170, and 176; the axial clearances 162, 164, 166, 168, 182, 184, 186, and 190; and the meshing zones 140, 142, and 143 partially restrict the flow of the pumped fluid medium and thus producing resistance to pumping action as the speed difference between the left and right driven shafts 16 and 18 increases. The partition clearances 146 and 150; the tooth-tip clearances 154, 158, 170, and 176; the axial clearances 162, 164, 166, 168, 182, 184, 186, and 190, are considered to be and hereinafter collectively called internal clearances 146, 150, 154, 158, 162, 164, 166, 168, 170, 176, 182, 184,186, and 190.

TYPICAL FLUID FLOW PATHS

The fluid medium has a natural tendency to move from each of the localized high-pressure zones 144 to each of the adjacent respective localized low-pressure zones 145. The fluid medium finds its way through paths of least resistance. Typical paths of least resistance are paths from one of the high-pressure zones 144 to the nearest low-pressure zones 145. If the fluid flow paths are traced from one of the left lateral meshing zones 140, at the high-pressure zone 144 towards the adjacent low pressure zones 145, the fluid medium can go to different adjacent low pressure zones 145 via different flow restricting paths.

As best shown in FIG. 16C with the fluid flows indicated by arrows attached to broken lines, the fluid medium can flow to the right, across the meshing zone 140, towards the adjacent one of the low pressure zones 145, via the left output gear lateral axial gap 182 as indicated by an arrow attached to a broken 193. The fluid medium can also flow through the left pinion tooth-tip gaps 154 as indicated by an arrow attached to a broken 194. The fluid medium can also flow through the left pinion lateral axial gap 162 as indicated by an arrow attached to a broken 195. The fluid medium can also flow through the left lateral meshing zone 140 as indicated by an arrow attached to a broken 196. The fluid medium can also flow through the left output gear medial axial gap 184 (fluid flow at left output gear medial axial gap 184 is not shown in FIG. 16C although the left medial output gear axial gap 184 can be seen in FIG. 15).

As best shown in FIG. 16C with the fluid flows indicated by arrows attached to broken lines, the fluid medium can also flow downward and to the left towards the other adjacent one of the low pressure zones 145, via the left output gear lateral axial gap 182 as indicated by an arrow attached to a broken 197. The fluid medium can also flow through the left output gear tooth-tip gaps 170 as indicated by an arrow attached to a broken 198. The fluid medium can also flow through the (fluid flow at the left output gear medial axial gap 184 is not shown in FIG. 16C although the left medial output gear axial gap 184 can be seen in FIG. 15). The fluid medium can also flow from the lateral portion 80 of the left pinion 64 towards the medial portion 82 of the left pinion 64 via the left partition gaps 146, one of the left partition gaps 146 being best shown in FIG. 15. Fluid flow paths at the right lateral meshing zones 143 are similar to that of the fluid flow paths 193, 194, 195, 196, 197, and 198 of the left lateral meshing zones 140.

If on the other hand the fluid flow paths are traced in one of the medial meshing zones 142, from the high-pressure zone 144 towards the adjacent low pressure zones 145, the fluid medium can go to different adjacent low pressure zones 145 via different flow-restricting paths. As best shown in FIG. 17C with the fluid flows indicated by arrows attached to broken lines, the fluid medium from one of the high pressure zones 144 can flow to the right and up, across the meshing zone 142, towards one of the adjacent low pressure zones 145, via the right pinion medial axial gap 168 as indicated by an arrow attached to a broken 199. The fluid medium can also flow through the medial meshing zone 142 as indicated by an arrow attached to a broken 200. The fluid can also flow through the left pinion medial axial gap 164 (fluid flow is not shown in FIG. 17C although the left medial pinion axial gap 164 can be seen in FIG. 15).

As best shown in FIG. 17C with the fluid flows indicated by arrows attached to broken lines, the fluid medium from the same one of the high pressure zones 144 can also flow to the left and upwards, to the other one the adjacent low pressure zones 145, via the right tooth-tip gaps 158, as indicated by an arrow attached to a broken 201. The fluid can also flow through the right pinion medial axial gap 168, as indicated by an arrow attached to a broken 202.

The fluid medium from the same one of the high pressure zones 144 can also flow to the right and down, towards the other one the adjacent low pressure zones 145, via the left tooth-tip gaps 154, as indicated by an arrow attached to a broken 203. The fluid medium can also flow through the left pinion medial axial gap 164 (fluid flow is not shown in FIG. 17C although the left medial pinion axial gap 164 can be seen in FIG. 15). The fluid medium can also flow from the medial portions 86 of the right pinions 66 to the lateral portions 84 of the right pinion 66 via the right pinion partitions gaps 150. Fluid can also flow from the medial portions 82 of the left pinions 64 to the lateral portions 80 of the left pinions 64 via the left pinion partition gaps 146. Fluid flows at the left and right partition gaps 146 and 150 are not shown in FIG. 17C but the left and right partition gaps 146 and 150 are shown FIG. 15.

Fluid flows are possible therebetween each of the partitions 78 and the teeth 68 of the medial portion 82 of each of the corresponding left pinions 64 and therebetween each of the partitions 78 and the teeth 68 of the lateral portion 80 of each of the corresponding left pinions 80. However, these are considered to be insignificant since each of the partitions 78 rotates with each of the corresponding left pinions 64 as a single unit and the partition 78 is always in contact with the teeth 68 of the medial and lateral portions 82 and 80 of each of the left pinions 64. The same thing also applies to each of the right pinions 66.

PUMPING RESISTANCE OR TORQUE AND FACTORS AFFECTING THE TORQUE

The limited slip differential has a pumping action to the fluid medium at the meshing zones 140, 142, and 143, each of which having high pressure zones 144 and low pressure zones 145. The resistance to pumping action or torque "T" is considered to be and similar to that of a positive displacement hydraulic pump. The resistance to pumping action or the torque "T" is substantially a product of pumping displacement "V" multiplied by average fluid pressure difference "P" between the high pressure zones 144 and the low pressure zones 145 divided by two pi (T=VP/2pi), plus a frictional variable.

a. Pumping Displacement

Since torque "T" is substantially directly proportional to the pumping displacement "V", arranging the left and right pinions 64 and 66, respectively, continuously and circumferentially significantly increases the pumping displacement "V", and thus increasing the resultant torque. Arranging the left and right pinions 64 and 66, respectively in a continuously circumferential manner significantly increases the number of left lateral meshing zones 140, medial meshing zones 142, and right lateral meshing zones 143. The continuous circumferential pinion arrangement also allows the left and right pinions 64 and 66 to be arranged closely to one another providing more space for additional left and right pinions 64 and 66, respectively, and thus more meshing zones 140, 142, and 143. Since each of the meshing zones 140, 142, and 143 functions as a pump that displaces the fluid medium, the increased number of meshing zones 140, 142, and 143 leads to an increase in pumping displacement "V" and thus increasing torque.

b. Pumping Speed

Figure 18:
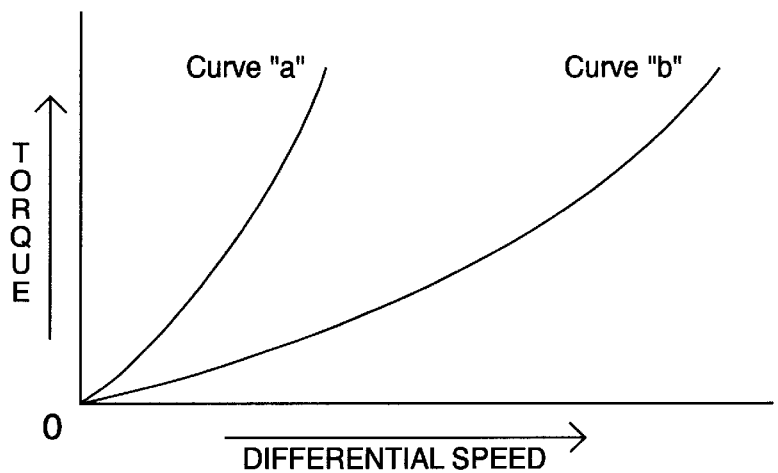
FIG. 18 shows torque characteristic of the limited slip differential with respect to differential speed.

Pumping action of the meshing zones 140, 142, and 143 of the limited slip differential 10 directly affects average pressure difference "P" therebetween the high-pressure zones 144 and the low pressure zones 145, and thus affects the torque of the limited differential 10. Average pressure difference is substantially related to resistance to flow of the pumped fluid across the internal clearances 146, 150, 154, 158, 162, 164, 166, 168, 170, 176, 182, 184, 186, and 190. At higher pumping speeds, increased resistance to flow and thus, increased pressure difference takes place therebetween the high-pressure zones 144 and the low-pressure zones 145, which results in increased pumping resistance or torque. The rate of increase of the average pressure difference, and thus torque, is greater than the rate of increase of the pumping speed or differential speed. The rate of increase of the average pressure difference with respect to pumping speed is similar to that of the rate of increase of pressure difference with respect to fluid flow velocity across an orifice or across a pipe. Typical resistance curves are shown in FIG. 18, which show torque with respect to differential speed.

c. Sizes of the Gaps or Internal Clearances

Generation of pressure difference, and thus torque, is also affected by the size of each of the internal clearances 146, 150, 154, 158, 162, 164, 166, 168, 170, 176, 182, 184, 186, and 190. At substantially narrow clearances, the pumped fluid can have more difficulty passing through the internal clearances 146, 150, 154, 158, 162, 164, 166, 168, 170, 176, 182, 184,186, and 190, resulting to increased pressure difference. Such increased pressure difference increases pumping resistance or torque at relatively low pumping speed as shown in curve "a" of FIG. 18. Large internal clearances 146, 150, 154, 158, 162, 164, 166, 168, 170, 176, 182, 184,186, and 190, lead to less difficulty for the pumped fluid to pass through. As a result, higher pumping speed is required before substantial pressure difference and thus substantial pumping resistance or torque is produced as shown in curve "b" of FIG. 18.

d. Viscosity of the Fluid Medium

Viscosity of the fluid medium also affects average fluid pressure difference within the limited slip differential 10. At high viscosity, the fluid medium can be pumped with difficulty through the internal 146, 150, 154, 158, 162, 164, 166, 168, 170, 176, 182, 184,186, and 190, resulting to increased average pressure difference and thus increased pumping resistance or torque at relatively low pumping speed depicted by curve "a" in FIG. 18. Low viscosity fluid medium can be pumped through the internal clearances 146, 150, 154, 158, 162, 164, 166, 168, 170, 176, 182, 184,186, and 190, with less difficulty. As a result, higher pumping speed is required before substantial pressure difference and thus substantial pumping resistance or torque is produced as shown in curve "b" of FIG. 18.

TYPICAL DRIVING CONDITIONS a. Slippery Road Surface

In a typical vehicle, the left and right rear wheels of the vehicle are driven by the left and right output shafts 16 and 18, respectively, and the input shaft 14 is driven by the output of a transmission. When either the left or the right wheel is on a substantially more slippery surface than the other, as, for example, when one wheel is on ice and the other wheel is on dry pavement, the wheel that is on the more slippery surface will rotate faster than the wheel that is on the dry pavement. The speed difference between the left and right output shafts 16 and 18, respectively, which results from the speed difference between the left and right wheels connected to the left and right output shafts 16 and 18, respectively, causes meshing between the left and right pinions 64 and 66, respectively, between the left helical output gear 57 and the left pinions 64, and between the right helical output gear 58 and the right pinions 66, which produces pumping action of the fluid medium. The pumping action of the fluid medium and the resistance to that pumping action is transferred as torque to the wheel that has the most traction. There is also an increase in the torque transfer to the wheel that has more traction, with greater speed differences between the left and right wheels. At higher differential speed, and thus higher pumping speeds, increased resistance to flow and thus, increased pressure difference takes place therebetween the high-pressure zones 144 and the low-pressure zones 145, which results in increased pumping resistance or torque. The rate of increase of the average pressure difference, and thus the torque, is greater than the rate of increase of the differential speed or the pumping speed. The rate of increase of the torque with respect to the differential speed is similar to that of the rate of increase of pressure difference across an orifice or across a pipe. Typical resistance curves are shown in FIG, 18, which show torque with respect to differential speed.

b. Straight Path

When the vehicle travels a substantially straight path on a substantially non-slippery road surface, both the left and right wheels and the respective the left and right output shafts 16 and 18 rotate at substantially the same speed as the casing 40, causing the left and right pinions 64 and 66 to remain stationary within the left and right accommodations 100 and 102, respectively. Substantially little or no resistance to fluid flow takes place, substantially little or no fluid pressure difference is developed, and, therefore, there is substantially little or no resistance to pumping action.

c. Curvilinear Path

When the vehicle makes either a left or right turn, as in normal driving on a substantially non-slippery road surface, a substantially small speed difference occurs between the left and right wheels and the respective left and right output shafts 16 and 18, which results in substantially slow pumping action by the left and right pinions 64 and 66 and the left and right helical output gears 57 and 58, respectively. The pumped fluid at slow flow can pass through the internal clearances 146, 150, 154, 158, 162, 164, 166, 168, 170, 176, 182, 184, 186, and 190 with less difficulty, which leads only to a small build up of the average pressure difference and thus minimal pumping resistance.

ALTERNATIVE EMBODIMENTS

Figure 19:
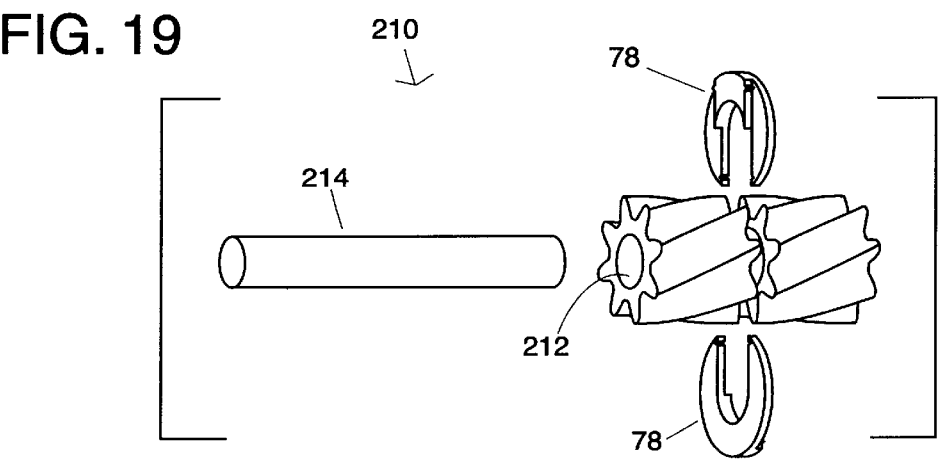
FIG. 19 is an exploded perspective view of an alternative embodiment of a pinion of the limited slip differential.

An alternative embodiment of a pinion 210 is shown in FIG. 19, which is substantially the same as the pinion 64 having the partitions 78, shown in FIGS. 11A, 11B, 12A, and 12B, except that the pinion 210 has a central hole 212 to accommodate a separate pinion shaft 214.

Figure 20:
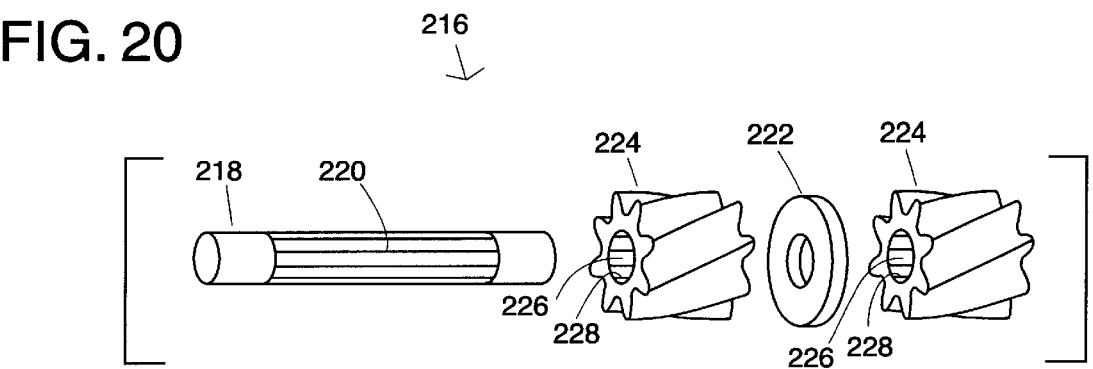
FIG. 20 is an exploded perspective view of another alternative embodiment of a pinion of the limited slip differential.

Another alternative embodiment of a pinion 216 is shown in FIG. 20, also having a separate shaft 218 and external splines 220 affixed thereto. The pinion 216 has a one-piece partition 222 and two separate substantially the same pinion sub units 224. Each pinion sub unit 224 has a central hole 226 and internal splines 228 affixed therethrough each of the pinion sub units 224. The internal splines 228 therethrough the pinion sub units 224 mate and interlock with the external splines 220 of the shaft 218.

Figure 21:
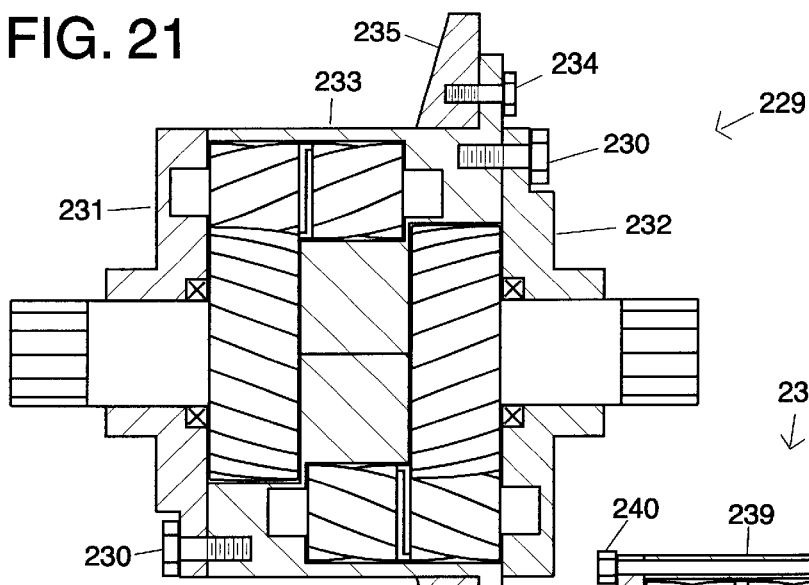
FIG. 21 is a section view of a portion of an alternative embodiment of a limited slip differential having retaining bolts.

An alternative embodiment of the limited slip differential 229 which is substantially the same as the limited slip differential 10 shown in FIGS. 1–20 is shown in FIG. 21, except that the limited slip differential 10 has retaining bolts 230 that affix the casing ends 231 and 232 to the casing body 233. Retaining bolts 234 are also shown, which retain bevel ring gear 235 to the casing body 233.

Figure 22:
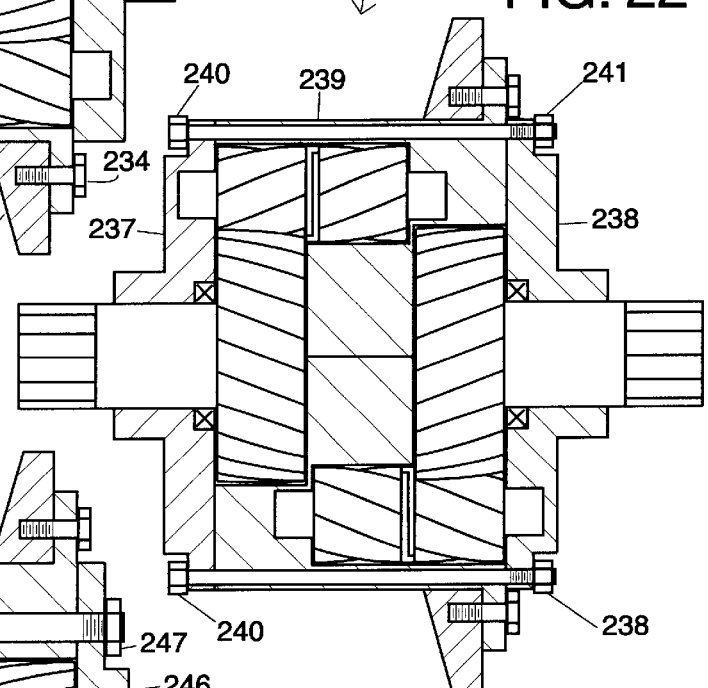
FIG. 22 is a section view of a portion of an alternative embodiment of a limited slip differential having alternative retaining bolts.

Another alternative embodiment of the limited slip differential 236 which is also substantially the same as the limited slip differential 229 in FIG. 21 is shown in FIG. 22, except that alternative casing ends 237 and 238 are affixed to alternative casing body 239 by long bolts 240 that pass through the casing body 239 and casing ends 237 and 238, respectively. The long bolts 240 are received by nuts 2341 on the other end of the limited slip differential 236.

Figure 23:
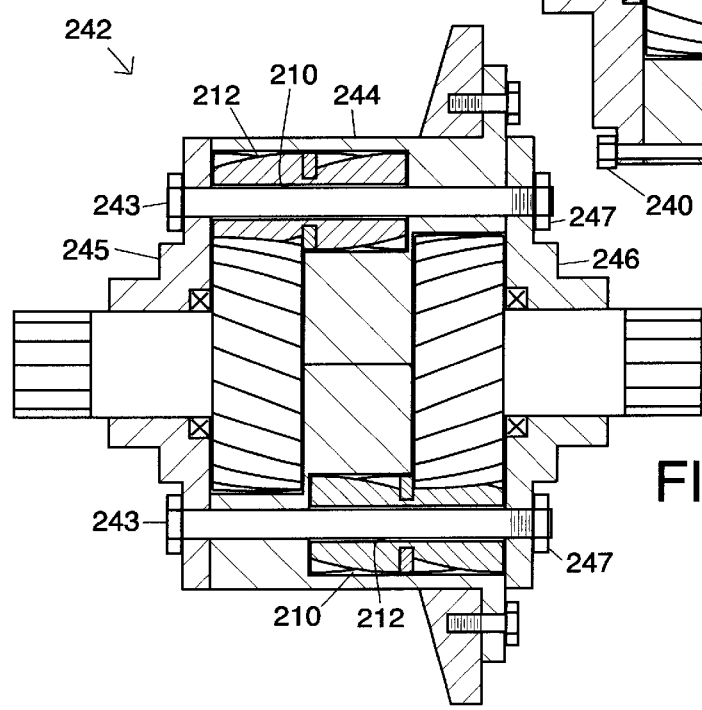
FIG. 23 is a section view of a portion of an alternative embodiment of a limited slip differential having alternative retaining bolts and alternative pinions.

Another alternative embodiment of the limited slip differential 242 which is also substantially the same as the limited slip differential 229 in FIG. 21, is shown in FIG. 23, except that long bolts 243 pass through alternative casing body 244 and casing ends 245 and 246, and are received by nuts 247 on another other end of the long bolts 243. In addition, the bolts 243 also pass through the central holes 212 of the alternate pinions 210 identical to that in FIG. 19. The bolts 243 serve as separate pinion shafts to the alternate pinion 210.

An alternative embodiment of a limited slip differential 250 is shown in FIG. 24, which is substantially the same as the limited slip differential 10 of FIGS. 1–20, and also substantially the same as the limited slip differential 229 of FIG. 21, except that the limited slip differential 250 has a bladder 252 situated therein a central accommodation 254 of an alternate casing body 256. An alternative output shaft 257 and alternative output gear 258 have a concentric hole 259 therethrough, having an inlet 261. The bladder 252 has an outlet 262 attached to the inlet 261 of the concentric hole 259. The bladder 252 can shrink or expand to accommodate volume changes of the fluid medium inside the limited slip differential 250 secondary to temperature variations such that when the fluid medium heats up and expand, the bladder 252 is compressed and shrinks. The bladder 252 shrinks by letting air from the bladder 252 escape outwards through the outlet 262 thereinto the inlet 261 and therethrough the hole 259 to the outside environment. When the fluid medium cools down and contracts, air is pulled into the bladder 252, which expands. The bladder 252 expands by drawing-in air from the environment through the hole 258 therethrough the inlet 261, the outlet 262 and thereinto.

Another alternative embodiment of a limited slip differential 270 is shown in FIG. 25, which is substantially the same as the limited slip differential 10 of FIGS. 1–20, and also substantially the same as the limited slip differential 229 of FIG. 21, except that the limited slip differential 270 has opposing bladders 272 and 273, respectively, situated therein opposing central accommodations 274 and 275, respectively, of another alternate casing body 276. Opposing alternative output shafts 277 and 278, respectively, and opposing alternative output gears 279 and 280, respectively, have opposing concentric holes 282 and 283, respectively, therethrough, having opposing inlets 284 and 285, respectively. The bladder 272 has an outlet 286 attached to the inlet 284 of the concentric hole 282. The bladder 272 can shrink or expand to accommodate volume changes of the fluid medium inside the limited slip differential 270 secondary to temperature variations such that when the fluid medium heats up and expand, the bladder 272 is compressed and shrinks. The bladder 272 shrinks by letting air from the bladders 272 escape outwards through the outlet 286 thereinto the inlet 284, and therethrough the concentric hole 282 to the outside environment. When the fluid medium cools down and contracts, air is pulled into the bladder 272, which expand. The bladder 272 expands by drawing-in air from the environment therethrough the concentric hole 282, the inlet 284, the outlet 286, and thereinto. The bladder 273 has an outlet 287 attached to the inlet 285 of the concentric hole 283. The bladder 273 can shrink or expand to accommodate volume changes of the fluid medium inside the limited slip differential 270 secondary to temperature variations such that when the fluid medium heats up and expand, the bladder 273 is compressed and shrinks. The bladder 272 shrinks by letting air from the bladders 273 escape outwards through the outlet 287 thereinto the inlet 285, and therethrough the concentric hole 283 to the outside environment. When the fluid medium cools down and contracts, air is pulled into the bladder 273, which expand. The bladder 273 expands by drawing-in air from the environment therethrough the concentric hole 283, the inlet 285, the outlet 287, and thereinto.

The internal clearances 146, 150, 154, 158, 162, 164, 166, 168, 170, 176, 182, 184,186, and 190, of the limited slip differential 10 may be varied to attain a desired torque shape in relation to differential speed. The fluid characteristics, such as viscosity, performance over temperature, or other suitable characteristics may be varied, and valves may also be incorporated into the limited slip differentials 10 to attain a variety of desired torque shapes with respect to differential speed, and a family of curves with respect to each, as shown in FIG. 18.

Other alternative embodiment of the limited slip differential 10 may have spur gears and spur-toothed pinions (not shown) although, the use of helical toothing on the left and right helical output gear 57 and 58, respectively, and on the left and right pinions 64 and 66 assures smooth meshing of gears, owing to contact carry-over. Yet other alternative embodiments of the limited slip differential 10 may have pinions having no partitions for ease of manufacturing and using a fluid medium having high viscosity within the limited slip differential 10 to attain sufficient pumping resistance at a substantially low differential speed.

Although the present invention has been described in considerable detail with reference to certain preferred versions thereof, other versions are possible. Therefore, the spirit and scope of the appended claims should not be limited to the description of the preferred versions contained herein.

What is claimed is:

1. A limited slip differential, comprising:
   a casing having a fluid medium therein said casing, said casing rotatably driven by an input member;
   a plurality of opposing pinions therein said casing, each said opposing pinion having a medial portion, a lateral portion, and a partition for pumping resistance, removably mouthed therebetween said medial portion and said lateral portion, said medial portions of said opposing pinions meshing one with the other;
   opposing gears, each said opposing gear having an output member; said opposing gears meshing with said lateral portions of said opposing pinions.

2. The limited slip differential according to claim 1, wherein further said limited slip differential has fluid pressure differential zones.

3. The limited slip differential according to claim 2, wherein rotational speed difference applied to said opposing gears imparts rotational speed difference between said opposing pinions.

4. The limited slip differential according to claim 2, wherein rotational speed difference applied to said opposing gears imparts rotational speed difference between said lateral portions of said opposing pinions.

5. The limited slip differential according to claim 2, wherein rotational speed difference applied to said opposing gears imparts rotational speed difference between said lateral portions of said opposing pinions and said medial portions of said opposing pinions.

6. The limited slip differential according to claim 3, wherein said rotational speed difference between said pinions imparts fluid pressure differences adjacent said fluid pressure differential zones.

7. The limited slip differential according to claim 3, wherein said fluid pressure differential zones are adapted to restrict fluid flow.

8. The limited slip differential according to claim 7, wherein said fluid pressure differential zones are adapted to provide resistance to meshing between said opposing pinions.

9. The limited slip differential according to claim 7, wherein said fluid pressure differential zones are adapted to restrict fluid flow and provide resistance to meshing between said opposing pinions.

10. The limited slip differential according to claim 9, wherein said fluid flow restrictions are adapted to provide resistance to differential speed between said opposing gears.

11. The limited slip differential according to claim 9, wherein said fluid flow restrictions are adapted to provide resistance to differential speed between said opposing output members.

12. The limited slip differential according to claim 3, wherein said rotational speed difference applied to said opposing gears is applied to said opposing gear output members.

13. The limited slip differential according to claim 1, wherein said opposing pinions are immersed in said fluid medium.

14. The limited slip differential according to claim 1, wherein said opposing gears are immersed in said fluid medium.

15. The limited slip differential according to claim 1, wherein each said pinion medial portion meshes with at least two each said opposing pinion medial portions.

16. The limited slip differential according to claim 1, wherein said casing has pinion accommodations, adapted to allow said opposing pinions to be rotatably mounted therein said pinion accommodations.

17. The limited slip differential according to claim 16, wherein each said opposing pinion accommodation has windows adapted to allow said opposing pinions to mesh one with the other.

18. The limited slip differential according to claim 17, wherein each said window has a fluid medium high pressure side and a fluid medium low pressure side.

19. The limited slip differential according to claim 18, wherein rotational speed applied to said opposing gears imparts rotational speed difference between said lateral portions of said opposing pinions and said medial portions of said opposing pinions and imparts fluid pressure differences on opposing sides of said windows.

20. The limited slip differential according to claim 18, wherein each said window high pressure side and each said window low pressure side has a fluid pressure difference therebetween, causing said fluid medium to flow from said high pressure side to said low pressure side.

21. The limited slip differential according to claim 17, wherein each said window is adapted to restrict fluid flow.

22. The limited slip differential according to claim 21, wherein said fluid flow restriction is adapted to provide resistance to meshing between said opposing pinions.

23. The limited slip differential according to claim 21, wherein said fluid flow restriction is adapted to provide resistance to differential speed of said opposing gears.

24. The limited slip differential according to claim 21, wherein said fluid flow restriction is adapted to provide resistance to differential speed of said opposing output members.

25. The limited slip differential according to claim 1, wherein said casing has gear accommodations, said opposing gears rotatably mounted therein said gear accommodations.

26. The limited slip differential according to claim 25, wherein each said opposing gear accommodation has windows adapted to allow said opposing gears to mesh with said lateral pinion portions.

27. The limited slip differential according to claim 26, wherein each said window has a fluid medium high pressure side and a fluid medium low pressure side.

28. The limited slip differential according to claim 26, wherein each said window is adapted to restrict fluid flow.

29. The limited slip differential according to claim 28, wherein said fluid flow restriction is adapted to provide resistance to meshing between said opposing gears and said opposing pinions.

30. The limited slip differential according to claim 28, wherein said fluid flow restriction is adapted to provide resistance to differential speed of said opposing gears.

31. The limited slip differential according to claim 28, wherein said fluid flow restriction is adapted to provide resistance to differential speed of said opposing output members.

32. The limited slip differential according to claim 1, wherein said medial portions of said opposing pinions mesh one with the other in a full circle of engagement.

33. The limited slip differential according to claim 1, wherein each said partition has partition sub units.

34. The limited slip differential according to claim 1, wherein each said partition has substantially identical C-shaped mating partition sub units.

35. The limited slip differential according to claim 1, wherein each said partition has substantially identical C-shaped mating partition sub units, each said partition sub unit having substantially the same keyed shape with side portions and raised base portion, said side portions have opposing indentations, and said raised base portion having opposing nibs, which mate and interlock one with the other, and are retained therebetween said lateral and said medial portions of said pinions.

36. The limited slip differential according to claim 1, wherein each said pinion has a groove separating said lateral portion and said medial portion of said pinion, each said pinion having a said partition therein said groove therebetween said lateral and said medial portions of said pinion.

37. The limited slip differential according to claim 1, wherein each said pinion has a groove separating said lateral portion and said medial portion of said pinion, each said pinion having a said partition therein said groove therebetween said lateral and said medial portions of said pinion, each said partition having substantially identical C-shaped mating partition sub units, each said partition sub unit having substantially the same keyed shape with side portions and raised base portion, said side portions having opposing indentations, and said raised base portion having opposing nibs, which mate and interlock one with the other, and are retained therebetween said lateral and said medial portions of said pinions.

* * * * *